(12) United States Patent
Yoshimura et al.

(10) Patent No.: US 7,177,869 B2
(45) Date of Patent: Feb. 13, 2007

(54) SERVICE RETRIEVING APPARATUS AND SERVICE RETRIEVING METHOD

(75) Inventors: Koichi Yoshimura, Ashigarakami-gun (JP); Junichi Okuyama, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 558 days.

(21) Appl. No.: 10/097,343

(22) Filed: Mar. 15, 2002

(65) Prior Publication Data
US 2003/0055817 A1   Mar. 20, 2003

(30) Foreign Application Priority Data
Sep. 19, 2001 (JP) .............................. 2001-284485
Oct. 24, 2001 (JP) .............................. 2001-325959

(51) Int. Cl.
*G06F 17/30* (2006.01)
(52) U.S. Cl. ..................................... 707/10; 707/104.1
(58) Field of Classification Search ............. 707/1–10, 707/100–104.1; 709/223–225; 370/316, 370/466; 713/201, 163–168, 200
See application file for complete search history.

(56) References Cited

U.S. PATENT DOCUMENTS

| | | | |
|---|---|---|---|
| 5,995,721 A * | 11/1999 | Rourke et al. ............. | 358/1.15 |
| 6,484,203 B1 * | 11/2002 | Porras et al. .............. | 709/224 |
| 6,487,594 B1 * | 11/2002 | Bahlmann .................. | 709/225 |
| 6,529,286 B1 * | 3/2003 | King .......................... | 358/1.14 |
| 6,584,082 B1 * | 6/2003 | Willis et al. ................ | 370/316 |
| 6,654,738 B2 * | 11/2003 | Nishioka et al. ............ | 707/3 |
| 6,678,827 B1 * | 1/2004 | Rothermel et al. ......... | 713/201 |
| 6,681,232 B1 * | 1/2004 | Sistanizadeh et al. ..... | 707/104.1 |
| 6,859,832 B1 * | 2/2005 | Gecht et al. ................ | 709/224 |
| 6,944,183 B1 * | 9/2005 | Iyer et al. ................... | 370/466 |
| 6,978,299 B1 * | 12/2005 | Lodwick ..................... | 709/223 |

FOREIGN PATENT DOCUMENTS

| | | |
|---|---|---|
| JP | A 10-56451 | 2/1998 |
| JP | A 11-167585 | 6/1999 |
| JP | A 11-195048 | 7/1999 |

* cited by examiner

*Primary Examiner*—Yicun Wu
(74) *Attorney, Agent, or Firm*—Oliff & Berridge, PLC

(57) ABSTRACT

When a retrieve request of a service is issued, a service retrieving apparatus according to the present invention sets a retrieve range of services within a wide-area network based upon both a service retrieving request source and a service use condition in accordance with both a geographical view point and communication conditions of networks. The service retrieving apparatus is installed in each of plural networks which constitute the wide-area network, detects a service server contained in each of these networks, and acquires service information. The acquired service information is also notified to the service retrieving apparatus of other networks.

24 Claims, 18 Drawing Sheets

FIG. 7

| SERVICE ID | UPDATE DATE/TIME | SERVICE INFORMATION |
|:---:|:---:|:---:|
| S1 | | |
| S2 | | |
| S3 | | |
| S4 | | |

FIG. 8

SERVICE INFORMATION

| | | |
|---|---|---|
| SERVICE SORT | | |
| NETWORK INFORMATION | | |
| GEOGRAPHICAL INFORMATION | | |
| USE PERMISSION INFORMATION | | |
| SERVICE ATTRIBUTE | GENERAL ATTRIBUTE | CHARGE INFORMATION |
| | | SECURITY INFORMATION |
| | | TRANSFER PROTOCOL INFORMATION |
| | | OPERATION ORGANIZATION INFORMATION |
| | SERVICE DEPENDING ATTRIBUTE | |

FIG. 10

| NETWORK ADDRESS OF SERVICE RETRIEVING APPARATUS | LIST OF CLUSTER REPRESENTATIVE POINT | CLUSTER SIZE |
|---|---|---|
| | | |
| | | |
| | | |
| | | |

FIG. 11

| CLUSTER ID | REPRESENTATIVE POINT | SERVICE BELONGING TO CLUSTER (LIST OF SERVICE ID) |
|---|---|---|
| C1 | | |
| C2 | | |
| C3 | | |
| C4 | | |

SERVICE RETRIEVING APPARATUS AND SERVICE RETRIEVING METHOD

BACKGROUND OF THE INVENTION

1. Field of the Invention

The present invention is related to a service retrieving method and a service retrieving apparatus for providing such information for a node which tries to receive a service, while this information indicates that which nodes provide which services in a network.

2. Description of the Related Art

While various sorts of services may be received via a network, even in the same sort of services, these services may contain certain services whose attributes such as qualities and communication protocols are different from each other, depending upon servers which may provide these services.

[Service Attribute]

For example, in the case that a user is connected via a network to a server so as to receive a print service, the following differences may exist, depending upon servers, namely, qualities such as resolution achieved in print-out operation; performance such as paper ejecting speeds; additionally-provided functions as to whether or not a sorter is equipped; communication protocols such as various sorts of print protocols; use permissions as to whether or not an access right is present; and expenses (will be referred to as "service attributes" hereinafter).

[Service Location (Service Position)]

Since a service may be identified based upon a network address, a domain name, and a URL (will be also referred to as a "service location (service position)" hereinafter) of a server apparatus which provides the service, a user can access the server apparatus for providing the service by using this service location from a client apparatus such as a scanner.

It should be understood in the below-mentioned descriptions that while an expression "server (apparatus)" and an expression "client (apparatus)" are described, the former implies such an apparatus for widely providing services and the latter implies such an apparatus for widely receiving services irrespective of actual names thereof.

In this case, as explained above, since services own attributes (service attributes), users are required to select a proper server by considering such a fact that which types of attributes of services may be received from any servers under which restriction conditions (protocols, charging methods and the like) and under which measuring bases (expenses etc.).

However, these users can hardly master such acknowledges. In particular, in the case that a user firstly accesses a network, and/or in such a case that while the user is separated from such a network to which this user usually accesses, this user temporarily accesses another network, the user normally has no such knowledge.

On the other hand, wide-area networks such as the Internet are constructed in such a manner that a plurality of networks are logically constituted in a hierarchical structure and these plural networks are mutually connected so as to form a collected member, while these plural networks correspond to IP subnets, enterprise intranets, Internet service providers, and the like. The above-explained respective networks are not made in an equal quality. That is, operation subjects of these networks are firstly different to each other, and many other aspects such as network designing methods and network operating methods are different from each other.

Networks contained in such a wide-area network are mutually connected to each other via relay apparatus such as routers and fire walls, while preventing occurrences of interference among these networks.

In order to retrieve a service location by considering a service attribute, for instance, there is such a service location extracting method. That is, while detecting attributes of services which are provided by all of nodes to which a user can reach in a network, such a service location which is desired by the user is extracted based upon the detected service attributes.

Such a service location retrieving method may be realized by, concretely speaking, a pre-registering system, a round-robin system, a multicast system, or a WWW robot retrieving system, and so on.

[Pre-Registering System]

In a pre-registering system, when a server which provides services is installed, while service locations, service attributes, and the like have been registered in a database equipped with a retrieve function, previously-registered information is retrieved, and the retrieved result is provided for a user.

As an example of this pre-registering system, there are described an enterprise organization directory using an LDAP (Lightweight Directory Access Protocol, Version 3; IETF PFC2251), and "Cleaning House" in XEROX corporation XNS "Summary of local area network, Ethernet" revised version-2, written by KAMIYA, published by MARUZEN K.K. on Mar. 25, 1988).

This pre-registering system requires such a database for managing service attributes and service locations of all of nodes in a network in a batch manner.

[Round-Robin System]

In a round-robin system, a client apparatus for retrieving services accesses all of network addresses contained in address spaces of a network so as to inquiry a service attribute.

As an example of this round-robin system, there is provided; Serial Pinging with employment of ICMP (Internet Control Message Protocol; IETF RFC792)•echo.

This round-robin system requires traffics and processing time in correspondence with a dimension of an address space.

[Multicast System]

In a multicast system, response requests to a server by way of a multicast communication (IP multicast etc.) are issued, and the server advertises own services by way of a multicast communication, or any one of these operations is carried out.

As an example of this multicast system, there are provided; an SLP (Service Location Protocol, Version 2; IETF RFC2608), and an SSDP (Simple Service Discovery Protocol).

In accordance with the multicast system, service attributes can be retrieved within a range over which multicast communications can be reached, the range over which multicast communications can be reached is restricted based upon routers/fire walls and existence time of packets (total HOP number of routers), and the like.

A range in which service attributes can be retrieved/acquired by this multicast system (will also be referred to as "service acquiring area") is restricted by a position in a network space, but is not directly restricted by a geographic distance between a server apparatus and a client apparatus.

In view of operations, the service acquiring area by way of the multicast system may be predicted to be limited to, for example, such a range as networks whose management subjects are identical to each other. As a result, the following prediction may be established. That is, a large number of service acquiring areas which are isolated from each other are present in a wide-area network.

The multicast system requires both processing time and traffics in response to a dimension of a reachable range of the multicast communication.

[WWW Robot Retrieving System]

In a WWW robot retrieving system, while a program called as either a "retrieve engine" or a "retrieve robot" is employed, a hyper link established in WWW information providing services is automatically traced so as to find out another WWW information providing service, and this found WWW information providing service is registered in a database. For instance, a keyword retrieve by a text with respect to this database is provided with a user.

As an example of this WWW robot retrieving system, Lycos and Alta Vista etc. are proposed.

Operations of the retrieve robot employed in this WWW robot retrieving system may depend upon such a WWW system as an HTTP (Hyper Text Transfer Protocol, Version 1.0; IETF RFC1945) and a W3C HTML (Hyper Text Markup Language), and the retrieve robot can retrieve only services provided by a WWW server.

Also, in accordance with this WWW robot retrieving system, since the retrieve robot traces the hyper link, large traffics occur in the network, and aplenty of processing time is required so as to reflect the retrieved results on the database and update the contents of the database.

Also, in an actual case, as previously explained, only the network retrieve function provider can apply this WWW robot retrieving system to a wide-area network.

[Retrieve Operation Executed by Considering Geographical Position]

Generally speaking, to provide services via a network, there is no geographical limitation but also no geographical distance. Services which may be utilized by users are not restricted based upon locations where server apparatus are installed.

As a consequence, a user who receives a service via a network may originally select a proper server apparatus by considering a service attribute, a restriction condition, and a measurement base, while this user need not consider a location where the server apparatus is installed, and but also such a fact that this server apparatus is connected to which network.

However, for instance, in such a case that a user is required to receive a service result such as a print service as goods, this user should consider a geographical position of a server apparatus in order to receive this service.

In such a case, the service retrieving operation should be performed as to a service location which is located close to both the user and a client apparatus, or another service location which is located at a user-accessible place even when this place is geographically located far from the user.

In this case, the service retrieving operation should be carried out by considering both a distance with respect to a network, and further, a geographical distance.

Generally speaking, in this case, there is no direct relationship between a geographical distance and a distance within a network. Therefore, for example, although a server apparatus is located in the vicinity of a user, since this server apparatus is connected to another network different from a network of a client apparatus, there is such a possibility that this server apparatus cannot be found out by a service retrieving operation closed in one network.

As a consequence, even when such a server apparatus is searched which is geographically located close to a user, a service retrieving operation should be carried out over a plurality of networks.

[Problems Caused by Use Permission]

Furthermore, in the case that a service is retrieved via a plurality of networks, there is a problem which is caused by a use permission.

In general, a use permission for using a service is performed by uniformly permitting uses of services to all of users, or by permitting a use of a service only to a re-registered user, irrespective of such a fact as to whether or not a user fee is charged.

In the latter case, namely in the case that a pre-registering operation is required for a use permission, an identification is required when a service is used.

While identification methods are different from each other every server apparatus, access to server apparatus cannot be permitted without entering passwords and thus, service attributes of server apparatus cannot be acquired in view of a security aspect.

As a consequence, even when a user tries to access such a server apparatus which employs the latter method, this user cannot access this server apparatus unless the user previously acquires a password, or the like for identification purposes, and therefore, this user cannot know the service attribute of this server apparatus.

As a method for providing such information for a node which tries to receive a service, while this information indicates that any nodes provide which services in a wide-area network where a plurality of networks are mutually connected to each other, for instance, Japanese Laid-open Patent Application No. Hei-10-56451 (will be referred to as a "publication 1" hereinafter) discloses the method for retrieving all of the nodes in the all-exclusive manner with employment of the ARP (Address Resolution Protocol) table.

Also, Japanese Laid-open Patent Application No. Hei-11-167585 (will be referred to as a "publication 2" hereinafter) describes such a method for collecting the information related to the services in the periodic manner by way of the multicast system so as to manage the collected information.

Also, Japanese Laid-open Patent Application No. Hei-11-195048 (will be referred to as a "publication 3" hereinafter) opens the method for determining the range used to retrieve the node in response to the cost information.

However, when the above-explained methods disclosed in the publications 1 to 3 are applied to a plurality of networks, a plenty of processing time is necessarily required, and also, traffics occurred in the networks are excessively increased.

SUMMARY OF THE INVENTION

The present invention has been made to solve the problems of the above-described conventional techniques, and therefore, has an object to provide such service providing method/apparatus capable of providing such information for a node which tries to receive a service, while this information indicates that any nodes provide which services in a network.

Also, the present invention has another object to provide such service providing method/apparatus capable of retrieving a desirable service within short processing time without excessively increasing traffics in a network.

Further, the present invention owns a further object to provide such service retrieving method/apparatus capable of easily retrieving a desirable service over a plurality of networks.

To achieve the above-described objects, a service retrieving system for a network, comprises:

a plurality of service providing apparatus for providing services;

a service retrieving apparatus comprising:

a retrieving range setting section for setting a retrieving range in which a service is retrieved;

a service retrieving section for retrieving a service in the retrieving range.

Preferably, there is provided the system, wherein the network has a plurality of regions;

wherein the service retrieving apparatus is a plurality of service retrieving apparatus;

wherein at least one service retrieving apparatus is disposed in each of regions;

wherein the retrieving range setting section sets at least a part of at least one of the regions as the retrieving region; and wherein each of service retrieving apparatus further comprise a service acquiring section for acquiring service information of each of service providing apparatus disposed in the same region as the each of service retrieving apparatus;

wherein the service retrieving section requests other service retrieving apparatus to retrieve the services and receives retrieved result from the other service retrieving apparatus.

Preferably, there is provided the system, wherein as the acquisition of the service information, the service acquiring section requests the service information for each of service providing apparatus disposed in the same region as each of service retrieving apparatus and receives the service information from each of service providing apparatus disposed in the same region.

Preferably, there is provided the system, wherein the service information includes use condition of the service;

wherein the service retrieving apparatus further comprises a filtering section for filtering the service information based on the use condition of the service information; and wherein the filtering section transmits the filtering result to the service retrieving section as a retrieved result.

Preferably, there is provided the system, wherein the service retrieving section retrieves the services in cooperate with the filtering section, when the service retrieving section receives a request from the service retrieving section of another service retrieving apparatus; and wherein the service retrieving section transmits the retrieved result to the service retrieving section of the another service retrieving apparatus.

Preferably, there is provided the system, wherein the service information and the retrieved result each includes geographical information as to positions of the service providing apparatus; and wherein the service range setting section sets the retrieving range based on the geographical information received from the service acquiring section.

Preferably, there is provided the system comprising directory apparatus for registering the service retrieving apparatus in each of regions thereon, wherein the retrieving range setting section detects another service retrieving apparatus in the same region as the retrieving range setting section;

wherein the retrieving range setting section registers the own service retrieving apparatus on the directory apparatus in accordance with the detection result; and wherein the service retrieving section requests each of other registered service retrieving apparatus to retrieve the services and receives the retrieved result from each of other registered service retrieving apparatus.

Preferably, there is provided the system, wherein the retrieving range setting section clusters positions of the service providing apparatus disposed in the same region as the retrieving range setting section based on the geographical information to generate cluster information;

wherein the retrieving range setting section acquires the cluster information generated in another region;

wherein the retrieving range setting section sets the retrieving range based on the cluster information generated in the same and another regions.

Preferably, there is provided the system, wherein the retrieving range setting section registers the cluster information on the directory apparatus; and wherein as the acquisition of the cluster information, the retrieving range setting section receives the cluster information generated in another region from the directory apparatus.

Preferably, there is provided the system, wherein the retrieving range setting section detects communication condition between the region of the service retrieving apparatus and the region of another service retrieving apparatus; and wherein the retrieving range setting section sets the retrieving range based on the detected communication condition.

Preferably, there is provided the system, wherein the service retrieving section retrieves the service information within the set retrieving range, when the service retrieving section receives a request and retrieving condition from the service retrieving section of another service retrieving apparatus; and the retrieving range setting section sets the retrieving range based on one of the request and the retrieving condition.

According to another aspect of the invention, a service retrieving method for retrieving services provided in a network, the method comprising the steps of:

setting a retrieving range in the network; and retrieving services in the set retrieving range in the network.

According to a still another aspect of the invention, there is provided a retrieving program for causing a computer to retrieve services provided in a network, comprising the steps of:

setting a retrieving range in the network; and retrieving services in the set retrieving range in the network.

According to the invention, there is provided a service retrieving system in a network having a plurality of regions, comprising:

a client apparatus including:

a first retrieving means for retrieving a position of a service providing apparatus within the network by communicating with a retrieving apparatus located in the same area; and a communication means for communicating with the service providing apparatus by employing both the position of the service providing apparatus obtained by the first retrieving means and a position of the service providing apparatus obtained by not using the first retrieving means in the network, the service providing apparatus including a notification means for notifying a position of the retrieving apparatus within each of regions to one of the client apparatus and the retrieving apparatus in another region, and also in which when a notification of the position of the retrieving apparatus within the another region is received, the notification means notifies the notified position of the retrieving apparatus within the another region to a retrieving apparatus located within the same region; and the retrieving apparatus installed in each of region, while the retrieving apparatus includes:
- a notification means for communicating with the retrieving apparatus located within another region by employing the notified position of the retrieving apparatus within the another region and also for mutually notifying the positions of the retrieving apparatus held by each of retrieving apparatus; and
- a second retrieving means for communicating with the retrieving apparatus located in the another region by employing the notified position of the retrieving apparatus within the another region in response to the communication of the client apparatus located in the same region so as to retrieve a position of the server apparatus.

According to the invention, there is provided a service retrieving apparatus disposed in a network, comprising:

a retrieving range setting section for setting a retrieving range in which services are retrieved; and a service retrieving section for retrieving a service in the retrieving range.

Preferably, there is provided the apparatus further comprising a service acquiring section, wherein the network has a plurality of regions;

wherein the retrieving range setting section sets at least a part of at least one of the regions as the retrieving region; and wherein the service acquiring section acquires service information of service providing apparatus disposed in the same region;

wherein the service retrieving section outputs a request to retrieve the services and receives retrieved result.

Preferably, there is provided the apparatus, wherein as the acquisition of the service information, the service acquiring section requests the service information for each of service providing apparatus disposed in the same region and receives the service information from each of service providing apparatus disposed in the same region.

Preferably, there is provided the apparatus, further comprising a filtering section, wherein the service information includes use condition of the service;

wherein a filtering section filters the service information based on the use condition of the service information; and wherein the filtering section transmits the filtering result to the service retrieving section as a retrieved result.

Preferably, there is provided the apparatus, wherein the service retrieving section retrieves the services in cooperate with the filtering section, when the service retrieving section receives a request; and wherein the service retrieving section outputs the retrieved result.

Preferably, there is provided the apparatus, wherein the service information and the retrieved result each includes geographical information as to positions of the service providing apparatus; and wherein the service range setting section sets the retrieving range based on the geographical information received from the service acquiring section.

Preferably, there is provided the apparatus, wherein the retrieving range setting section detects another service retrieving apparatus in the same region;

wherein the retrieving range setting section registers the own service retrieving apparatus on a directory apparatus in accordance with the detection result; and wherein the service retrieving section outputs a request to retrieve the services and receives the retrieved result.

Preferably, there is provided the apparatus, wherein the retrieving range setting section clusters positions of the service providing apparatus disposed in the same region as the retrieving range setting section based on the geographical information to generate cluster information;

wherein the retrieving range setting section acquires the cluster information generated in another region;

wherein the retrieving range setting section sets the retrieving range based on the cluster information generated in the same and another regions.

Preferably, there is provided the apparatus, wherein the retrieving range setting section registers the cluster information on the directory apparatus; and wherein as the acquisition of the cluster information, the retrieving range setting section receives the cluster information generated in another region from the directory apparatus.

Preferably, there is provided the apparatus, wherein the retrieving range setting section detects communication condition between the region of the service retrieving apparatus and another region; and wherein the retrieving range setting section sets the retrieving range based on the detected communication condition.

Preferably, there is provided the apparatus, wherein the service retrieving section retrieves the service information within the set retrieving range, when the service retrieving section receives a request and retrieving condition; and the retrieving range setting section sets the retrieving range based on one of the request and the retrieving condition.

BRIEF DESCRIPTION OF THE DRAWINGS

FIG. 7 is a diagram for indicating service information held by a service information acquiring section (FIG. 6) of the service retrieving apparatus (service retrieving program).

FIG. 8 is a diagram for representing service information transferred from a server apparatus to a primary service retrieving apparatus.

FIG. 10 is a diagram for showing cluster information which is registered into a directory apparatus by the retrieve range setting section (FIG. 9) of the service retrieving apparatus (service retrieving program shown in FIG. 6).

FIG. 11 is a diagram for representing a server distribution information which is outputted from a clustering section indicated in FIG. 9 to a service opening section (FIG. 6).

DETAILED DESCRIPTION OF THE PREFERRED EMBODIMENTS

[Conceptional Idea of Service Retrieving Operation According to the Invention]

In a service retrieving operation according to the present invention, while a plurality of service acquiring areas are contained in a wide-area network and the like, the respective channels are closed to perform a service retrieving operation respectively, such a service which is provided every acquired area (service acquiring area) is retrieved. Then, the retrieved service is acquired as service information (will be explained later with reference to FIG. 7) in connection with geographic information of a server apparatus which provides a service.

Also, a service acquiring area may be referred to as such an area that management subjects and operation methods are identical to each other within this area, and networks are made in equal qualities to each other.

As an example of this service acquiring area, the following ranges may be conceived, namely, a range where a multicast communication is available; a range where a fire wall does not interrupt; and a range where network resources are registered in one directory.

While the acquired service information is opened inside and outside the service acquiring area, an opening level containing a plurality of stages is set to each of the service information to be opened.

In the case that a provision of the opened service information is requested, a filtering process operation is carried out, and then, the service information is provided for the request source. This filtering process operation may determine as to whether or not the service information is opened to the request source in response to both the user of the request source and the network.

When service information is retrieved in the service retrieving operation according to the present invention, first of all, such a range used for the service retrieving operation is set. Then, the opened service information is retrieved within the set retrieving range, and such information as a service location and a service attribute which are obtained as a result of this retrieving operation is provided for a user.

[Setting Method of Retrieving Range]

The above-explained setting method of setting the retrieving range will now be described more in detail.

Figure 1:
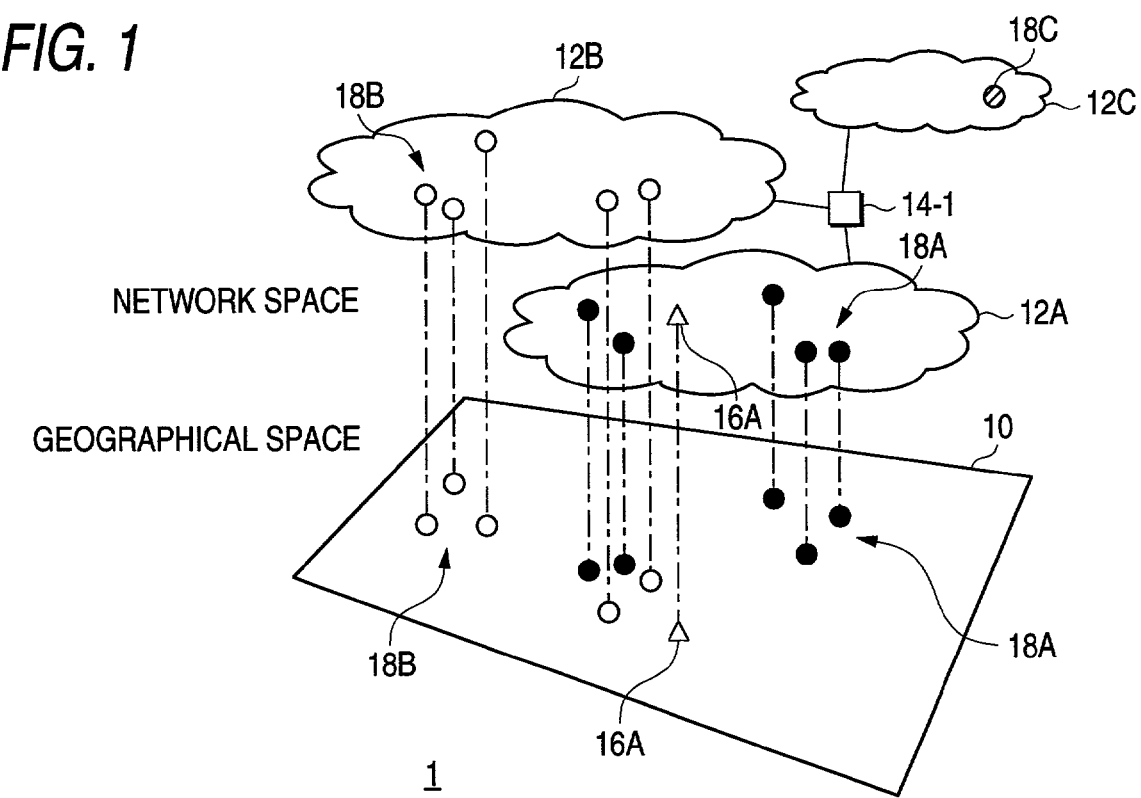
FIG. 1 is a diagram for schematically exemplifying an arrangement of a wide-area network containing a plurality of networks.

FIG. 1 illustratively shows a structure of a wide-area network 1 containing a plurality of networks.

The wide-area network 1 contains, for example, three networks (networks A, B, C) 12A, 12B, 12C which are mutually connected to each other via a network relay apparatus 14-1.

The network 12A contains a client apparatus 16A, and a plurality of server apparatus 18A which are indicated by black-colored circles shown in FIG. 1. The network 12B includes a plurality of server apparatus 18B which are represented by white-colored circles shown in FIG. 1. The network 12C contains a server apparatus 18C.

[Setting of Retrieving Range in View of Geographical Space]

As apparent from FIG. 1, a spread of the wide-area network 1 may be observed by a view point of a geographical space 10 and also a view point of a network space.

Figure 2:
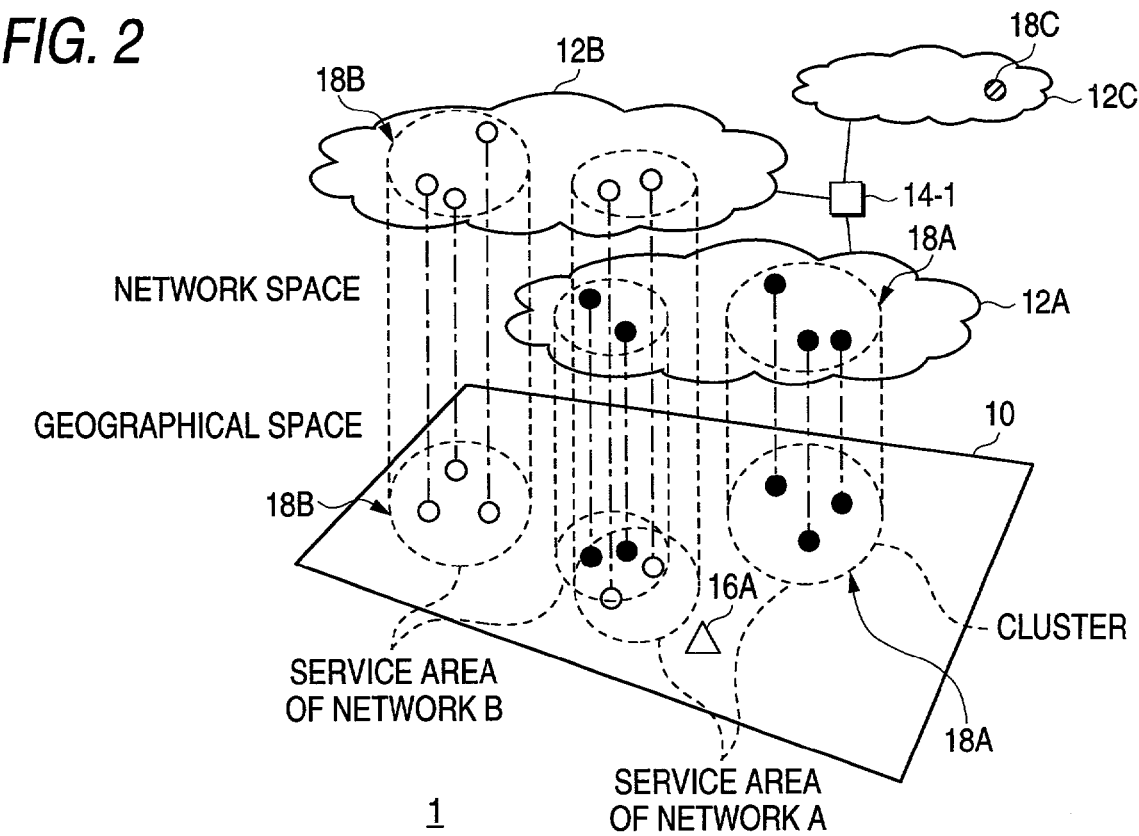
FIG. 2 is a diagram for representing a positional relationship between client apparatus and server apparatus in a view point of a geographical space in the wide-area network shown in FIG. 1.

FIG. 2 is a diagram for schematically showing a geographic positional relationship from the view point of the geographical space 10 of the client apparatus 16A, and the server apparatus 18A and 18B in the wide-area network 1 shown in FIG. 1.

As shown in FIG. 1, as viewed from the client apparatus 16A, since the server apparatus 18B of the network 12B is connected via the network relay apparatus 14-1 by observing from the view point of the network space, this server apparatus 18B is located at a higher position than a position of the server apparatus 18A of the network 12.

On the other hand, as indicated in FIG. 2, either a portion of a service area by the network 12A may be overlapped with a portion of a service area by the network 12B, or an entire portion of the service by the network 12A may be overlapped with an entire portion of the service by the network 12B on the geographical space 10. As a result, in view of the geographical space 10, the server apparatus 18B may be represent at a position close to the client apparatus 16A, as compared with the server apparatus 18A.

For instance, as to such a service as a print service (namely, a user should geographically receive a resultant article of this service), instead of employing the server apparatus 18A, if the server apparatus 18B is employed, then the user of the client apparatus 16A can have a merit. Thus, while a top priority is given to a geographical point of a server apparatus, a service retrieving range may be determined.

Furthermore, in the case that a distribution of the server apparatus 18A and the server apparatus 18B involves eccentricity to some extent within the service areas of the networks 12A and 12B, geographic ranges where the respective server apparatus 18A and 18B can provide the services may be conceived as such ranges where the plural server apparatus 18A and 18B are geographically distributed.

As a consequence, as indicated in FIG. 2, such server apparatus having a relationship of geographically close-positions with each other within a plurality of server apparatus 18A and 18B are subdivided into a plurality of groups. When each of such ranges where the server apparatus 18A and 18B contained in these groups is divided as one region (cluster) (namely, clustering operation), a set of these cluster regions may be conceived as the respective geographical service areas of the server apparatus 18A and 18B.

As geographical information indicative of each of geographical positions of these server apparatus 18A, 18B, and 18C (when anyone of these server apparatus is indicated without any specific definition, this server will also be simply referred to as a "server apparatus 18" hereinafter), there are latitude/longitude, governmental section names, postal codes, and altitude. In the case that this geographical information is commonly used among a plurality of service retrieving apparatus, both contents and formats of this geographical information among these service retrieving apparatus must be united.

[Setting of Retrieving Range in View of Network Space]

Figure 3:
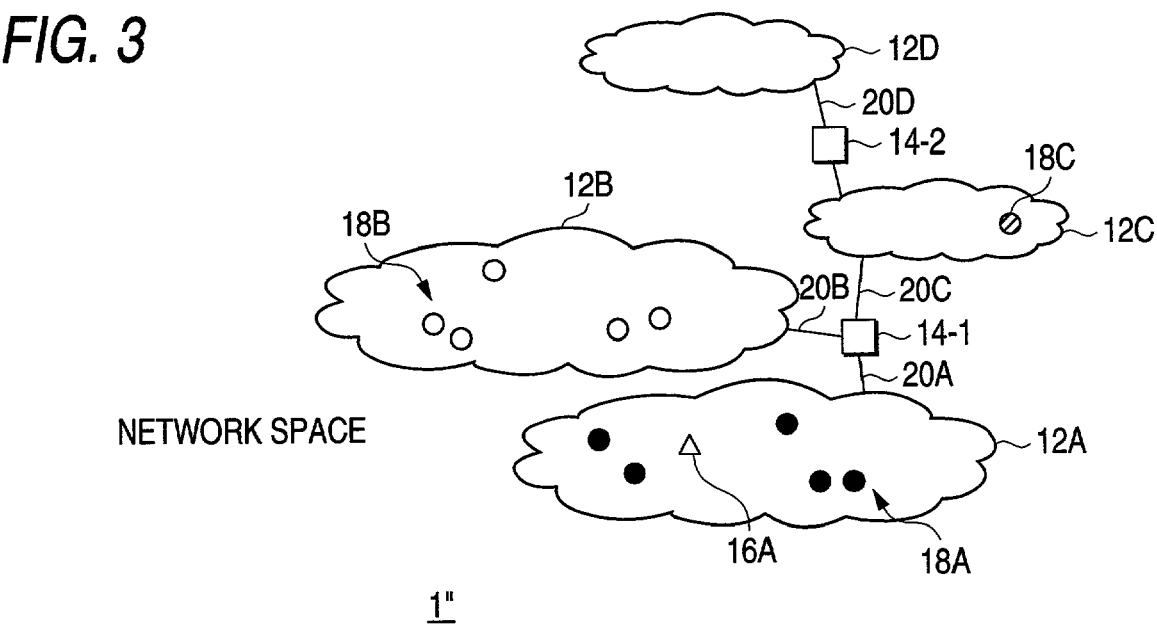
FIG. 3 is a diagram for indicating a geographical positional relationship between client apparatus and server apparatus in a view point of a network space in the wide-area network (FIG. 1 and FIG. 2) to which the network is added via a network relay apparatus (R2).

FIG. 3 is a diagram for illustratively indicating a positional relationship among the client apparatus 16A, and both the server apparatus 18A and 18B, in view of the network space within the wide-area network 1 (see FIG. 1 and FIG. 2) to which a network 12D is added via a network relay apparatus (R2) 14-2.

On the other hand, as to such a service that a distance in view of the geographical space 10 does not constitute a principal restriction condition, for instance, as to a service when data is downloaded from a WWW server, the following service provision has a merit for a user. That is, such a server apparatus is selected and then, the user receives a service from this selected server apparatus which can transfer data to the client apparatus 16A in a higher speed irrespective of such a fact as to whether or not this server apparatus is connected to the network 12A which is the same network as the client apparatus 16A, and also irrespective of such a fact as to whether the geographical distance of this server apparatus is a near distance, or a far distance, In such a case, a retrieving range of a service may be determined by considering such a view point of the network space, for example, transfer speeds and transfer capacities of the networks 12A to 12C (when any one of networks 12A to 12C is indicated without no specific definition, this network will be simply referred to as a "network 12" hereinafter).

Concretely speaking, as shown in FIG. 3, the transfer speeds and the transfer capacities of the respective networks inside the network 12; transfer speeds and transfer capacities of relay links (LA to LD) 20A to 20D, which connect these networks; and overheads/process loads realized in network relay apparatus 14-1/14-2 which execute the relay process operations among these networks may give adverse influences to the communications among the client apparatus 16A and these server apparatuses 18A, 18B, 18C.

These elements may be sensed as the response speeds of the server apparatus 18A to 18C, and also the throughput when the file is transferred in the client apparatus 16A.

As a result, in the case that a top priority is given to the view point of the network space, the retrieving range of the service may be limited to the server apparatus 18A, 18B. That is, while a communication path is evaluated based upon a total relay stage number of networks and a transfer band of a bottle neck, these server apparatus 18A, 18B are located within a range connectable to the client apparatus 16A via such a communication path by which high-speed data transfer operation can be predictably realized.

In other words, in the case that a top priority is given to the view point of the network space, for instance, since a distance in the network space is evaluated by employing an evaluation function expressed by the below-mentioned formula (1), the retrieving range of the service may be obtained.

$$f \text{ (total relay stage number of networks, transfer band of bottle neck); "f" being a function} \qquad (1).$$

In this case, the following evaluation is made that the smaller the total relay stage number of networks becomes, the shorter the distance in the network space is decreased. Also, another evaluation is made as follows: That is, the higher the transfer speeds of such bottle necks as the relay links 20A to 20D, and the network relay apparatus 14-1 and also the network relay apparatus 14-2 becomes, and furthermore, the larger the transfer capacities become, the shorter the distance in the network space is decreased.

A total relay stage number in this evaluation function "f" may be calculated as, for example, a total number of these network relay apparatus 14-1 and 14-2 among these client apparatus 16A, and server apparatus 18A, 18B, 18C. This total number corresponds to, for example, a total HOP number of routers.

Also, a transfer capacity in this evaluation function "f" may be predicted from both time required to transfer data and a size of the data. Also, such information may also be acquired from a remote network as such network information, for instance, MIB (Management Information Base) information of SNMP (Simple Network Management Protocol; IEFT RFC821).

Furthermore, there is another case that the transfer capacity in this evaluation function "f" may be acquired by this SNMP from a router apparatus and the like, or while a data communication is actually carried out, the transfer capacity in this evaluation function "f" may be predicted by way of an end-to-end manner.

[First Embodiment]

A first embodiment of the present invention will now be described.

Figure 4:
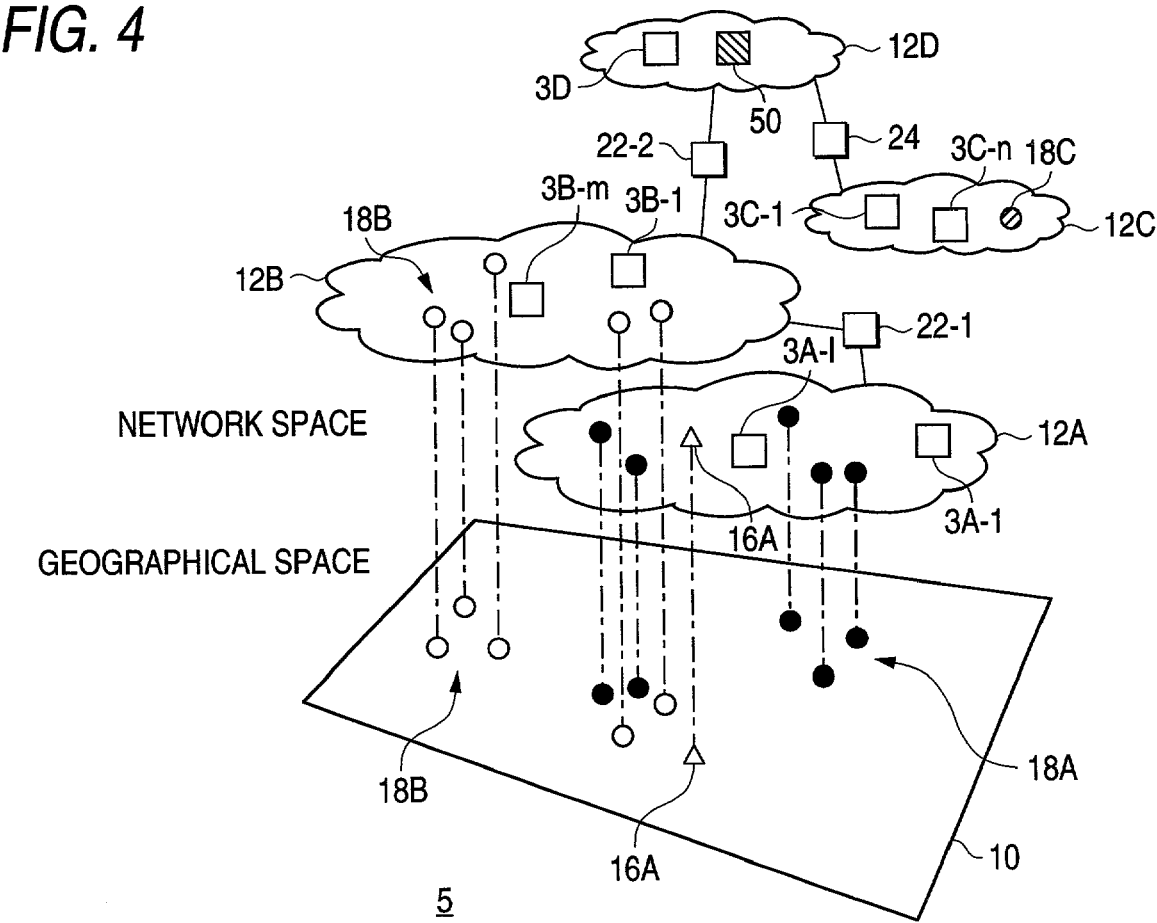
FIG. 4 is a diagram for exemplifying an arrangement of a second wide-area network in which a service retrieving apparatus according to the present invention is employed.

FIG. 4 is a schematic diagram for exemplifying an arrangement of a second wide-area network 5 which employs service retrieving apparatus 3A-1 to 3D according to the present invention. In such a case that any one of these service retrieving apparatus 3A-1 to 3D is represented without any specific definition, this service retrieving apparatus will also be simply referred to as "servic retrieving apparatus 3A to 3D", or "service retrieving apparatus 3" hereinafter.

As illustrated in FIG. 4, the second wide-area network 5 is constructed as follows: That is, networks 12A and 12B such as an IP network are connected via a router apparatus 22-1 to each other, a network 12B is connected via a router apparatus 22-2 to a network 12D, and a network 12C is connected via a fire wall apparatus 24 to a network 12D.

The network 12A contains client apparatus 16A, server apparatus 18A, and one, or more service retrieving apparatus 3A-1 to 3A-1. The network 12B contains a server apparatus 18B, and one, or more service retrieving apparatus 3B-1 to 3B-m. The network 12C contains a server apparatus 18C.

This network 12C further contains one, or more service retrieving apparatus 3C-l to 3C-n (symbols "l", "m", and "n" indicate integers).

The network 12D contains both a directory apparatus 50 and the service retrieving apparatus 3D.

It should be understood that in this wide-area network 5, communications other than a multicast communication among the respective nodes are carried out based upon both a message described by using the XML language and the HTTP protocol.

Figure 5:
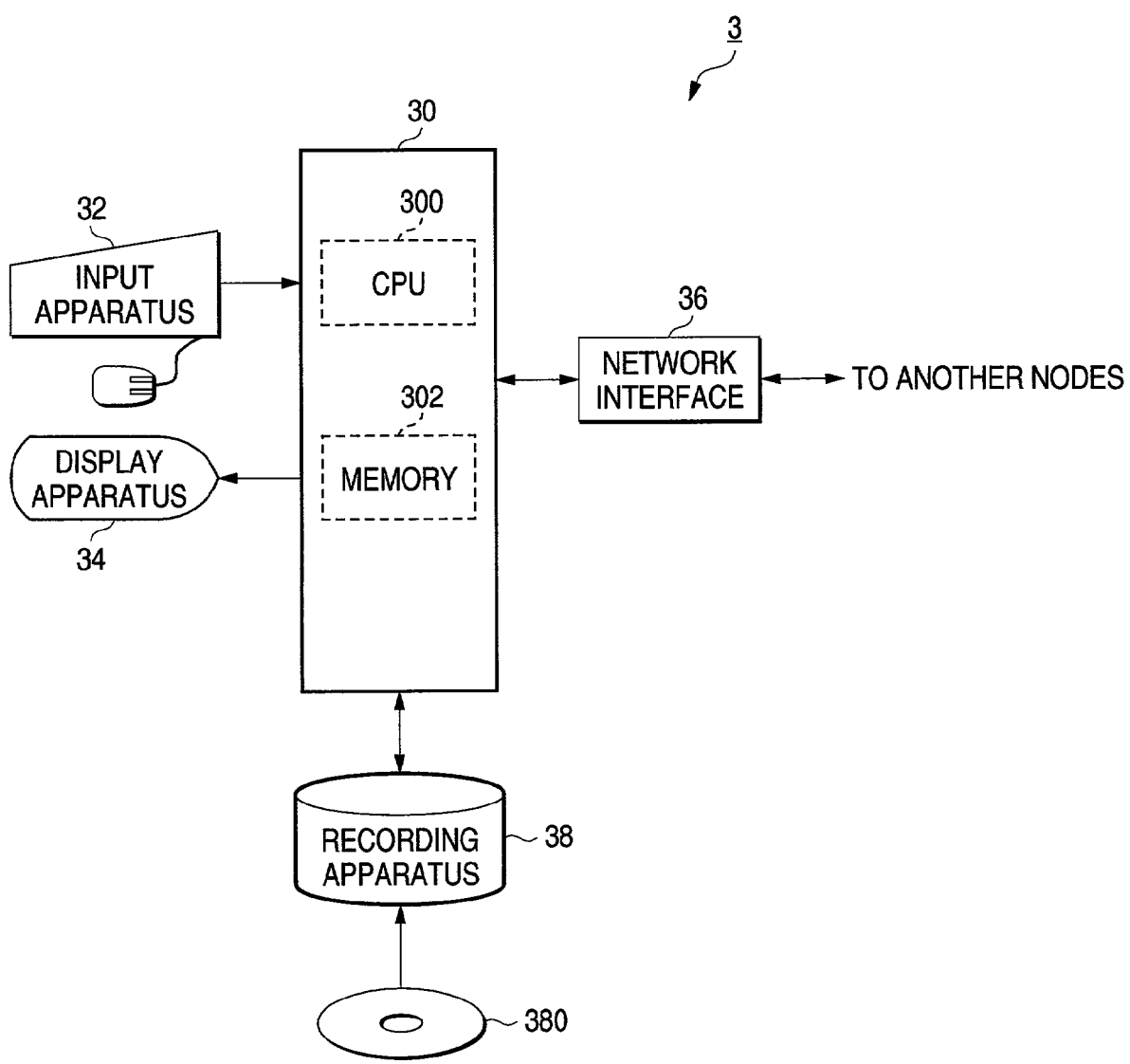
FIG. 5 is a diagram for indicating a hardware structure of the service retrieving apparatus indicated in FIG. 4.

FIG. 5 is a schematic diagram for indicating a hardware structure of the service retrieving apparatus 3 shown in FIG. 4.

As shown in FIG. 5, the service retrieving apparatus 3 is constituted by a computer main body 30, an input apparatus 32 such as a keyboard and a mouse, a display apparatus 34, a network interface (network IF) 36, and a recording apparatus 38, while this computer main body 30 contains a CPU 300, a memory 302, and so on.

In other words, the service retrieving apparatus 3 employs such a structure in the form of a computer having a communication function with respect to other nodes (namely, client apparatus 16A, server apparatus 18A to 18C, and other service retrieving apparatus 3).

Figure 6:
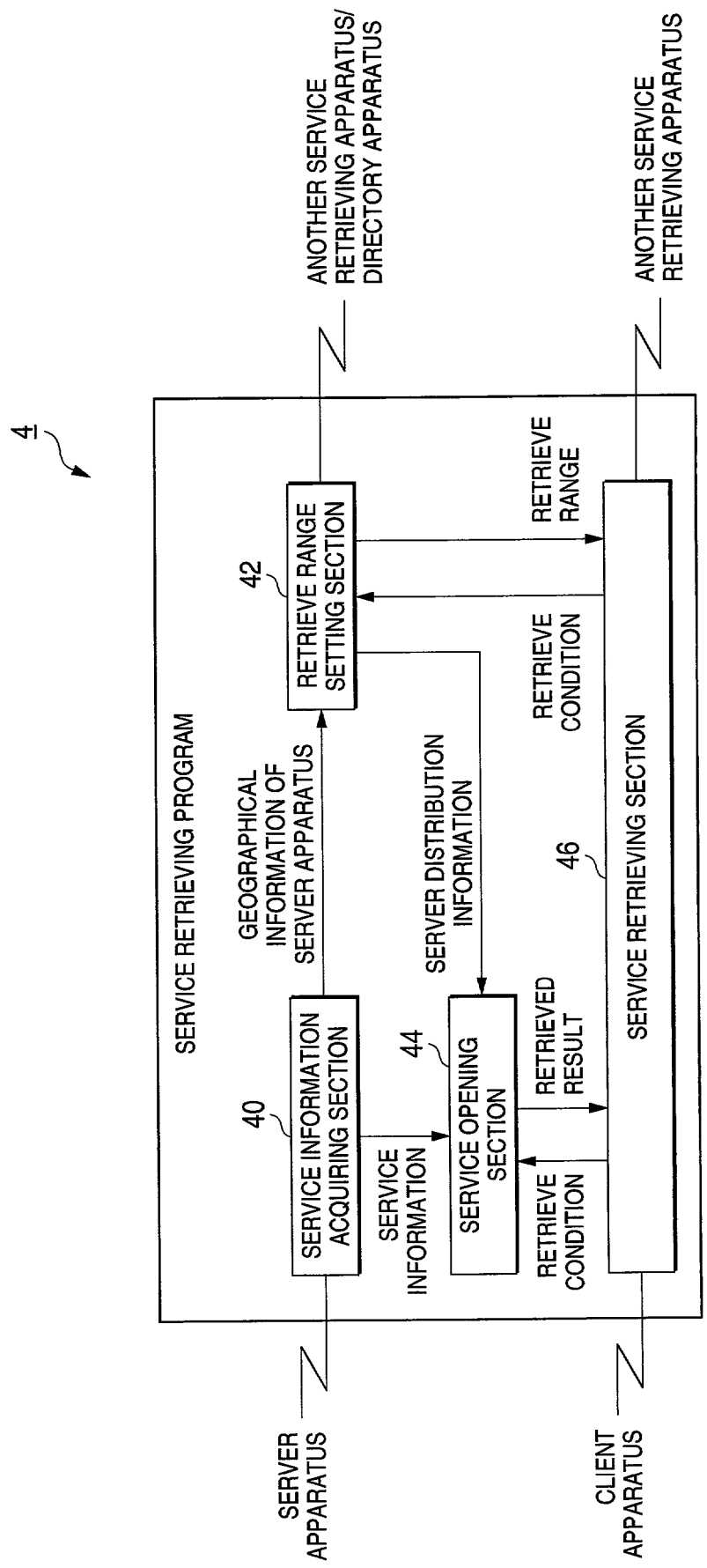
FIG. 6 is a diagram for indicating a structure of a service retrieving program which executes a service retrieving operation in the service retrieving apparatus shown in FIG. 4.

FIG. 6 is a schematic diagram for representing a structure of a service retrieving program 4 which executes a service retrieving operation in the service retrieving apparatus 3 shown in FIG. 4.

As shown in FIG. 6, the service retrieve program 4 is constituted by a service information acquiring section 40, a retrieve range setting section 42, a service opening section 44, and a service retrieving section 46. For example, this service retrieving program 4 is supplied by a recording medium 380 shown in FIG. 5 to the service retrieving apparatus 3, and is loaded on a memory 302 so as to be executed.

The service retrieving program 4 may realize the above-explained service retrieving operations according to the present invention by way of these structural components.

[Service Information Acquiring Section 40]

In this case, as explained above, a service acquiring area indicates such an area that while a plurality of service acquiring areas are contained in a wide-area network, or the like, the respective service acquiring areas are closed so as to detect services and to acquire services, respectively.

For the sake of simple explanation, such a case that each of the service acquiring areas of the service retrieving apparatus 3 is equal to each of the networks 12 will now be assumed as a concrete example.

For instance, while each of the networks 12 is recognized as one service acquiring area, the service information acquiring section 40 acquires service information from the server apparatus 18 contained in the service acquiring area.

In other words, in the network 12A, the service information acquiring section 40 of the service retrieving apparatus 3A (service retrieving program 4) acquires service information indicative of a service attribute and the like, while this service attribute contains a quality of a service and a communication protocol, which are provided by each of a plurality of server apparatus 18A belonging to this network 12A.

Also, in the network 12B, the service information acquiring section 40 acquires service information of each of a plurality of server apparatus 18B which belong to this network 12B.

Also, in the network 12C, the service information acquiring section 40 acquires service information of each of a plurality of server apparatus 18C which belong to this network 12C.

It should also be noted that the service information acquiring section 40 saves the acquired information in such a format as indicated in FIG. 7.

Then, the service information acquiring section 40 provides as a service database, these saved service information used to be retrieved by the service information opening unit 44, and also, outputs geographical information of the server apparatus 18 shown in FIG. 8 to the retrieve range setting section 42.

As a concrete example of "update day/date time" represented in FIG. 7, both a date and a time instant such as "2001.3.20 11:51" may be used. A content of "service information" will be explained later with reference to FIG. 8.

FIG. 7 is a schematic diagram for indicating the service information saved by the service information acquiring section 40 (see FIG. 6) of the service retrieving apparatus 3 (service retrieve program 4).

As shown in FIG. 7, the service information acquiring section 40 saves therein service identifiers (service IDs), the update dates/time instants, and the service information in correspondence with each other.

The content of this service database is used to be retrieved by the service opening section 44, and the updated content thereof is notified to both the retrieve range setting section 42 and the service opening section 44.

FIG. 8 is a schematic diagram for showing such service information which is transferred from the server apparatus 18 to a service retrieving apparatus 3.

As indicated in FIG. 8, this service information contains various data as to a service sort, network information, geographic information, use permission information, and a service attribute.

The service attribute contains a general attribute and a service depending attribute.

The general attribute contains data as to charge information, security information, transfer protocol information, and operation organization information.

The service sort indicates a sort of a service provided by the server apparatus 18, for example, indicates either a print service or a scan service.

The network information represents information which is required so as to exclusively discriminate the server apparatus 18 in the wide-area network 5, while this information indicates, for example, an IP address, an FQDN (Fully Qualified Domain Name), or a URI (Universal Resource Identifier).

The geographical information contains such information indicative of geographical information of the server apparatus 18.

The geographical information contains as necessary geographical information, both latitude and longitude information of a place where the server apparatus 18 is located, and also contains as other arbitrary information, various information as to an address of a building where the server apparatus 18 is installed, a name of this building, a floor number of a room, a floor section, and a name of this room.

The use permission information indicates a range where the server apparatus 18 provides services. For instance, this use permission information indicates such a message that the server apparatus 18 may provide services for any of the client apparatus 16 of the network 12 without any limitation, or such a message that the server apparatus 18 may provide services only limited to the network 12 to which the server apparatus 18 belongs.

The charge information of the general attribute shows a use fee and a payment method of a service provided by the server apparatus 18.

The security information shows a security protocol corresponding to a service provided by the server apparatus 18.

The transfer protocol information indicates both a communication protocol and an API (Application Program Interface), which are used so as to receive a service provided by the server apparatus 18.

The operation organization information shows a name, a title, and a contact method of an enterprise, a department, a group, or an individual, which operates services provided by the server apparatus 18.

The service depending attribute is set with respect to each of sorts of services which are provided by the server apparatus 18, and this service depending attribute indicates a quality of a service, performance thereof, an additionally provided function thereof, a format of a corresponding document thereof, a language corresponding thereto, a character set corresponding thereto, and a supplier name of a driver program.

[Retrieve Range Setting Section 42]

Figure 9:
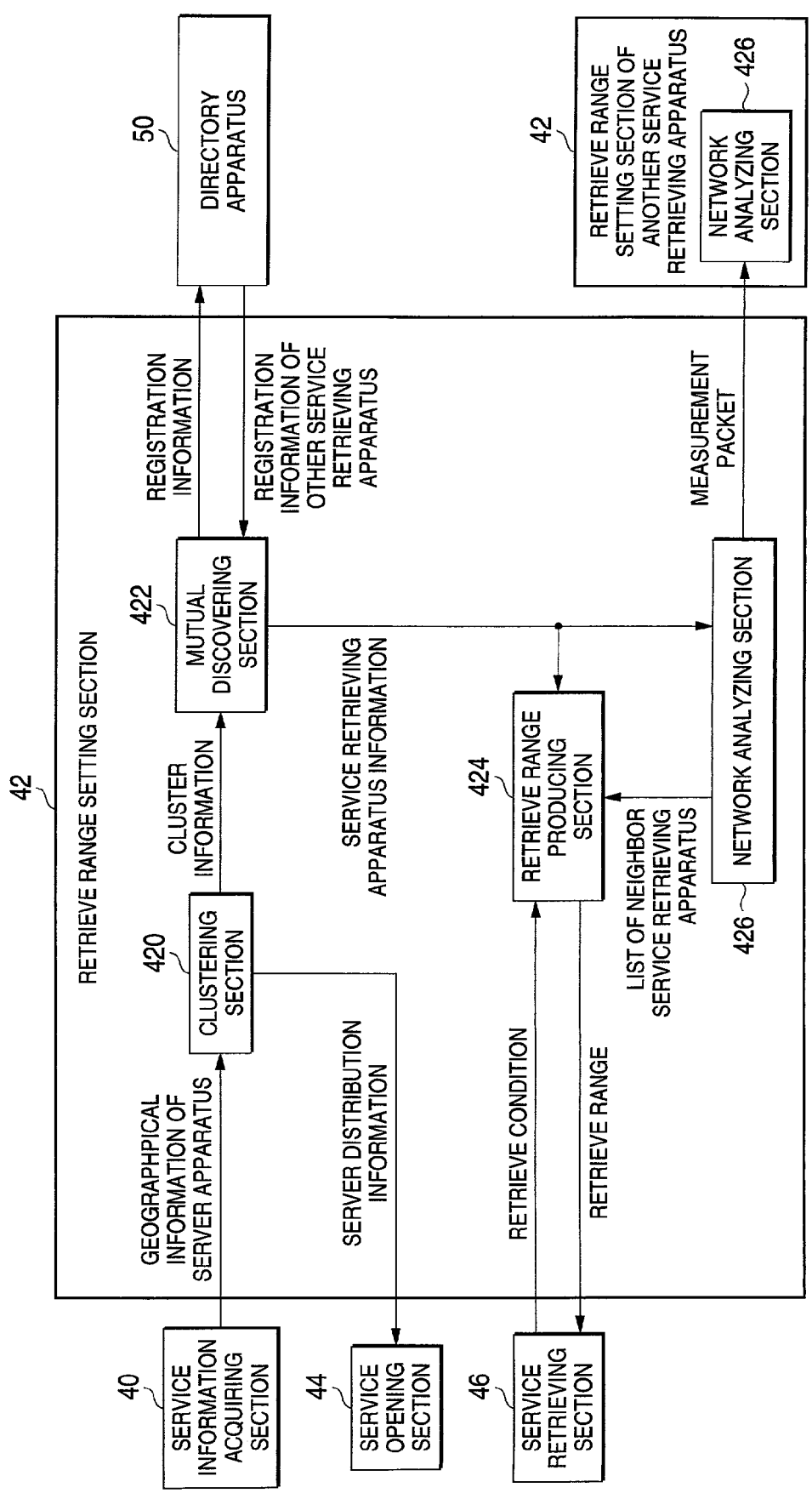
FIG. 9 is a diagram for showing a structure of a retrieve range setting section shown in FIG. 6.

FIG. 9 is a schematic block diagram for indicating an arrangement of the retrieve range setting section 42 shown in FIG. 6. As indicated in FIG. 9, the retrieve range setting section 42 has a clustering section 420, a mutual discovering section 422, a retrieve range producing section 424, and a network analyzing section 426.

The retrieve range setting section 42 inquires the total stage number and the data transfer capacity (network information) of the router apparatus 22 shown in FIG. 4 with respect to another retrieve range setting section 42 of another service retrieving apparatus 3 (service retrieving program 4), and sets both a service retrieve range obtained from a viewpoint of a geographical space, and a retrieve range obtained from a view point of a network space by using these structural components.

[Clustering Section 420]

In the retrieve range setting section 42, the clustering section 420 further processes the geographical information of the service information (FIG. 8) which is entered from the service information acquiring section 40, and clustering-processes a geographical distribution of the server apparatus 18 in such a network 12 to which the own clustering section 420 belongs, as represented in FIG. 2, so as to form clusters.

Furthermore, the service retrieving apparatus 3 sets an average value (gravity center) of latitude/longitude coordinate values of the clusters which are formed in the above-described manner, as a representative point of this cluster. In addition, the service retrieving apparatus 3 sets the longest distance among such distances measured from the representative point to the respective server apparatus 18, as dimensions (cluster sizes) of the respective clusters.

FIG. 10 is a schematic diagram for representing cluster information which is registered by the retrieve range setting section 420 (FIG. 9) of the service retrieving apparatus 3 (service retrieving program 4 shown in FIG. 6) into the directory apparatus 50.

FIG. 11 is a schematic diagram for indicating server distribution information which is outputted from the clustering section 420 shown in FIG. 9 to the service opening section 44 (FIG. 6).

The clustering section 420 outputs such cluster information containing both the representative point of the cluster and the cluster size, as indicated in FIG. 10, among the produced information, to a mutual discovering section 422.

Also, as indicated in FIG. 11, the retrieve range setting section 420 outputs server distribution information to the service opening section 44, while this server distribution information contains a cluster ID, a representative point, and a list of services (service IDs) which are provided by the respective server apparatus 18 contained in the respective clusters.

As an example of the content of the network address of the service retrieving apparatus shown in FIG. 10, such an IP address as "139. 168. 0.1" may be proposed. Also, as an example of the content of "cluster representative point list", such latitude and longitude as "E139° 44' 35.66" N35° 39' 58.76" and "E139° 44' 25.27", N35° 40' 08.30" may be proposed. Also, as an example of the content of "cluster size", a numeral value such as 100 meters may be proposed.

Also, as an example of "representative point" indicated in FIG. 11, such latitude and longitude may be proposed, namely, a representative point of a cluster ID.C1 is "E139° 44' 35.66", N35° 39' 58.76"; the representative point of the cluster ID.C1 is "E139° 44' 25.27", N35° 40' 08.30." Further, as an example of "service belonging to cluster (list of service ID)", such an ID "S3, S4" may be proposed as to C1, and such an ID "S1, S2" may be proposed as to C2.

[Mutual Discovering Section 422]

Figure 12:
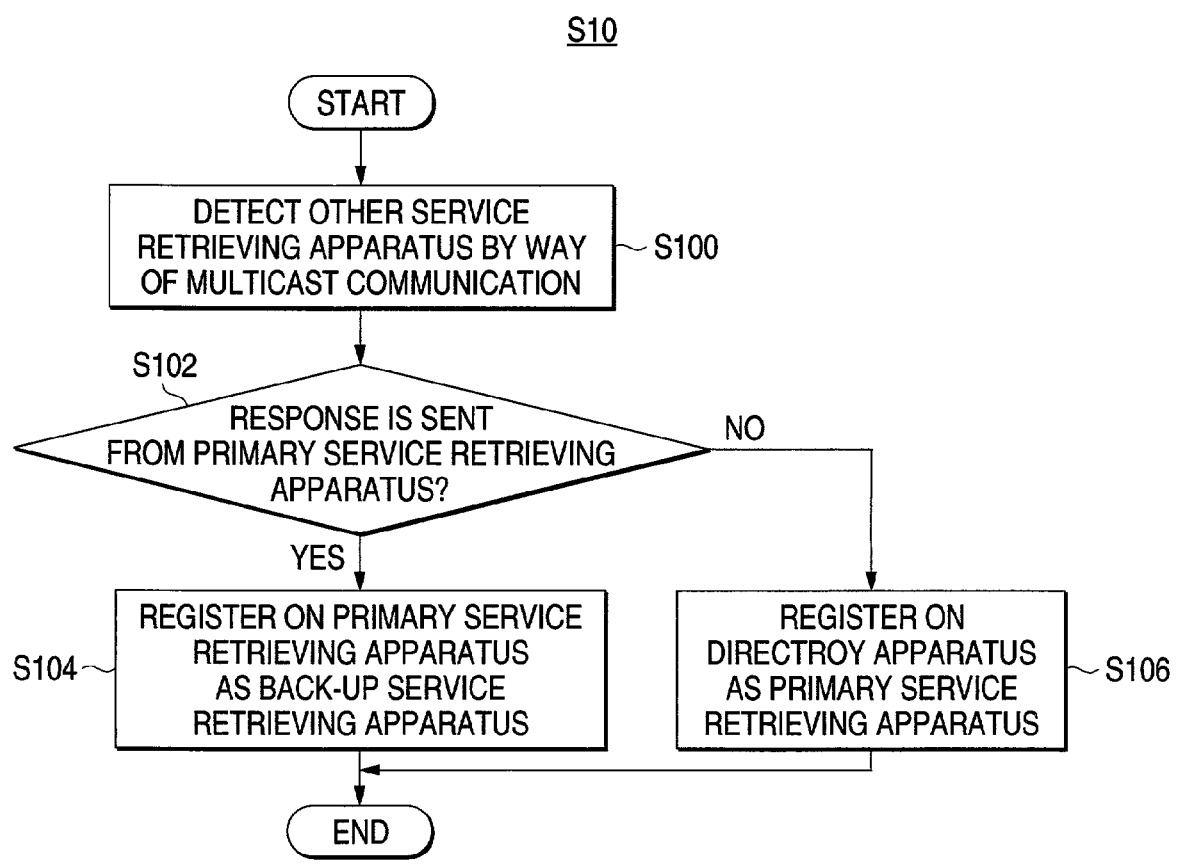
FIG. 12 ia a flow chart for describing a mutual discovering process operation and a registering operation to a directory apparatus by the mutual discovering section shown in FIG. 9.

FIG. 12 is a flow chart for describing such process operations that the mutual discovering unit 422 shown in FIG. 9 executes a mutual discovering process operation, and executes a registering operation to a directory apparatus.

In such a case that a plurality of service retrieving apparatus 3 are present within one of networks 12A to 12D, any one of the service retrieving apparatus 3 (service retrieving program 4) within one network 12 is operated as a primary service retrieving apparatus 3, and other service retrieving apparatus 3 (service retrieving program 4) are operated as back-up service retrieving apparatus 3. It should be noted that when any of these networks 12A to 12D is indicated without any specific definition, this network will also be simply referred as a "network 12" hereinafter.

In a step 100 (S100), the mutual discovering section 422 (FIG. 9) of the retrieve range setting section 42 of the service retrieving apparatus 3 (service retrieving program 4) which is activated in any one of the networks 12 requests responses to other service retrieving apparatus 3 contained in the same network 12 by way of a multicast communication, and waits for such responses for a predetermined time period, and also, publicly opens the presence of the own mutual discovering section 422 to other service retrieving apparatus 3.

In a step 102 (S102), the mutual discovering section 422 which has carried out the multicast communication (S100) judges as to whether or not a response is sent from the primary service retrieving apparatus 3. When such a response is sent, this process operation is advanced to a process operation defined in a step S104. In other cases, the process operation is advanced to another process operation defined in a step S106.

In the step 104 (S104), the mutual discovering section 422 which has performed the multicast communication recognizes the own mutual discovering section as the back-up service retrieving apparatus 3.

The primary service retrieving apparatus 3 which has sent back this response registers the service retrieving apparatus which has carried out the multicast communication as a back-up service retrieving apparatus.

In the step 106 (S106), the mutual discovering section 422 which has carried out the multicast communication recognizes the server retrieving apparatus 3 to which the own mutual discovering section 422 belongs as the primary service retrieving apparatus 3, and is communicated with the directory apparatus 50 by employing a previously set network address of the directory apparatus 50.

[Registering of Primary Service Retrieving Apparatus 3 on Directory Apparatus 50]

Furthermore, since the mutual discovering section 422 of the service retrieving apparatus 3 (service retrieving program 4) which has carried out the multicast communication is communicated with the directory apparatus 50, in such a case that the service retrieving apparatus 3 to which the own mutual discovering section 422 belongs is entered into the directory apparatus 50 and both the address and the cluster information (FIG. 10) have already been registered as the information of the primary service retrieving apparatus 3, the mutual discovering section 422 leaves this registered information of the primary service retrieving apparatus 3.

Also, in the case that an address of another service retrieving apparatus 3 has been registered as the primary service retrieving apparatus 3, the mutual discovering section 422 deletes an entry of another service retrieving apparatus 3, and forms an entry of the service retrieving apparatus 3 to which the own mutual discovering section 422 belongs. Then, the mutual discovering section 422 registers both the network address and the cluster information (FIG. 10) of the service retrieving apparatus 3 to which the own mutual discovering section 422 belongs as the information of the primary service retrieving apparatus 3 on the formed entry.

Also, in such a case that the network address of any of the service retrieving apparatus is not registered on the directory apparatus 50, the mutual discovering section 422 forms an entry of the service retrieving apparatus 3 to which the own mutual discovering section 422 belongs. Then, the mutual discovering section 422 registers both the address and the cluster information (FIG. 10) of the service retrieving apparatus 3 to which the own mutual discovering section 422 belongs as the information of the primary service retrieving apparatus 3 on the formed entry.

The service retrieving apparatus 3 of each of the networks 12 accesses the directory apparatus 50 of the network 12D so as to acquire the network address of the primary service retrieving apparatus 3 of the arbitrary network 12, so that the communication can be carried out.

Also, the mutual discovering section 422 receives both the address and the cluster information (FIG. 10) of the primary service retrieving apparatus 3 of another network 12 from the directory apparatus 50, and notifies these received address and cluster information to the retrieve range producing section 424.

Also, the mutual discovering section 422 notifies the address of the primary service retrieving apparatus 3 of another network 12 to the network analyzing section 426.

[Primary Service Retrieving Apparatus and Back-Up Service Retrieving Apparatus]

As previously described, only the primary service retrieving apparatus 3 which is registered on the directory apparatus 50 provides the service retrieving function with respect to the client apparatus located within the same network, and the back-up service retrieving apparatus 3 does not provide the service retrieving function under normal condition.

It should also be noted that the back-up service retrieving apparatus 3 is registered on the primary service retrieving apparatus 3, and performs a health check operation with respect to the primary service retrieving apparatus 3 in a periodic manner so as to check as to whether or not this primary service retrieving apparatus 3 is operated under normal operation.

In the case that the primary service retrieving apparatus 3 is not operated under normal operation, these back-up service retrieving apparatus 3 execute negotiations with each other, and any one of these back-up service retrieving apparatus 3 provides the service retrieving function instead of the primary service retrieving apparatus 3 which has so far provided the service retrieving function.

[Network Analyzing Section 426]

The network analyzing section 426 transmits a measurement packet to all of the addresses of the primary service retrieving apparatus 3 of another network 12 which is entered from the mutual discovering section 422, and thus, analyzes a mutual connection relationship of the networks 12A to 12D.

Concretely speaking, for instance, the network analyzing section 426 transmits an ICMP echo packet by incrementing a TTL (Time to Live) one by one in order to sense a total number of router apparatus 22 located in a path connected between the primary service retrieving apparatus 3 and the primary service retrieving apparatus 3 of another network 12. It should also be noted that when any one of the router apparatus 22-1 and the router apparatus 22-2 is indicated without any specific definition, this router apparatus will be also and simply referred to as a "router apparatus 22" hereinafter.

Also, for example, the network analyzing section 426 may predict a data transfer capacity between the own primary service retrieving apparatus 3 and another primary service retrieving apparatus 3 by employing a method called as an "ICMP echo packet" which continuously transmits an ICMP pair packet.

Based upon both the total number of the router apparatus 32 and the data transfer capacity, which have been acquired in accordance with the above-described method, the network analyzing section 426 arranges the networks in such an order that, for example, data can be predictedly transferred in a high speed as such information indicative of the distances among the respective service retrieving apparatus 3 in the network space, and then, outputs the arranged networks to the retrieve range producing section 424.

[Retrieve Range Producing Section 424]

Based upon the retrieve condition entered from the service retrieving section 46, the retrieve range producing section 424 produces such a retrieve range information and then returns this produced retrieve range information to the service retrieving section 46, while this retrieve range information contains both an address of a primary service retrieving apparatus 3 of another network 12 which should be set as the retrieve range, and also information (FIG. 10) of such a cluster which should be set as the retrieve range.

The retrieve condition to be inputted contains, for example, a service sort, a retrieve subject region used to designate a geographical position of a server apparatus 18, and also information indicative of such a retrieve subject network which designates the network 12 to be retrieved form the view point of the network space. This service sort is necessarily required, and other information may be handled as omittable information.

In the case that the retrieve subject region is designated, the retrieve range producing section 424 produces a retrieve range based upon a representative point of a cluster and a size of this cluster, which are contained in the cluster information (FIG. 10) of the primary service retrieving apparatus 3 of another network 12 which is entered from the mutual discovering section 422.

In this case, for example, the retrieve range producing apparatus 424 involves such a cluster which is geographically located close to the client apparatus 16 irrespective of such a fact as to whether or not the client apparatus 16 belongs to any one of the networks 12A to 12D. It is noted that if no definition is made that a client apparatus belongs to any one of the networks 12A to 12D, this client apparatus will be also and simply referred to as a "client apparatus 16" hereinafter. Also, when a retrieve network is designated, the retrieve range producing section 424 retrieves an address of a primary service retrieving apparatus 3 of the designated network 12 from the addresses of the primary service retrieving apparatus 3 of other networks 12 which are entered from the mutual discovering section 422.

Also, in such a case that both the retrieve subject region and the retrieve network are omitted, the retrieve range producing section 424 judges the designated service sort, and when the designated service should consider the retrieve subject region, this retrieve range producing section 424 performs the above-described process operation executed in the case that the retrieve subject region is designated.

Also, in this case, when a service to be retrieved need not consider the retrieve subject region, the retrieve range producing section 424 involves into the retrieve range, either a cluster located in a short distance in viewpoint of the network space with respect to the client apparatus 16 or such a cluster which is predicted to be able to transfer data in a high speed.

[Service Opening Section 44]

Figure 13:
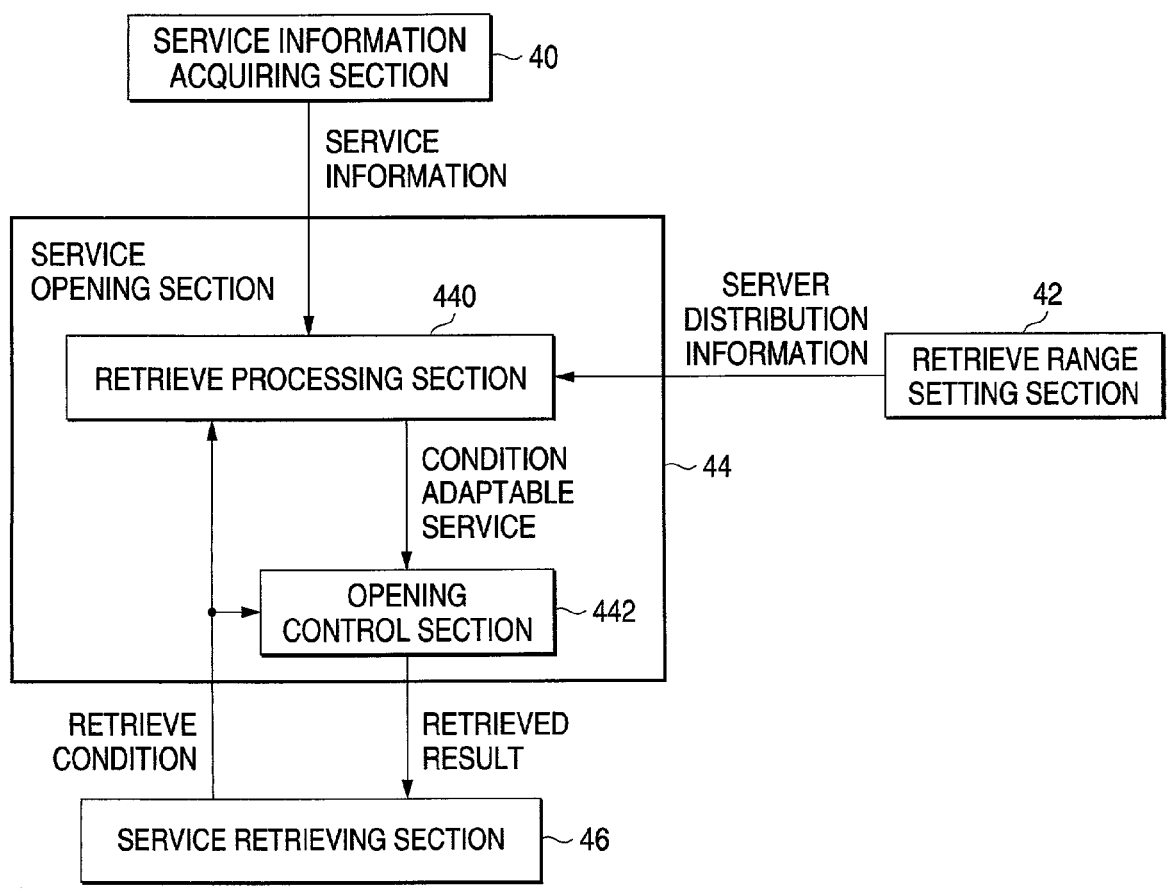
FIG. 13 is a diagram for indicating an arrangement of a service opening section of the service retrieving apparatus (service retrieving program of FIG. 6).

FIG. 13 is a schematic block diagram for indicating an arrangement of the service opening section 44 of the service retrieving apparatus 3 (service retrieving program 4 shown in FIG. 6).

As indicated in FIG. 13, the service opening section 44 is arranged by a retrieve processing section 440 and an opening control section 442.

The service opening section 44 retrieves the contents of the service database (see FIG. 7) of the service information acquiring section 40 in response to a retrieve condition supplied from the service retrieving section 46, executes a filtering process operation based upon the use permission information contained in the service information, and returns such service information of the server apparatus 18 which is capable of satisfying both the retrieve condition and a condition of this filtering process operation as a retrieve result to the service retrieving section 46 with employment of these structural components.

[Service Opening Section 440]

The service opening section 440 retrieves the contents of the service database (FIG. 7) of the service information acquiring section 40 based upon the retrieve condition entered from the service retrieving section 46, and then, outputs such service information of the server apparatus 18, which is fitted to the retrieve condition, as a retrieve result to the opening control section 442.

The retrieve condition may contain cluster IDs (see FIG. 11) of all of clusters which are included in the retrieve range entered from the retrieve range setting section 42, and also contains the network address of the client apparatus 16 which requests to retrieve the service.

It should also be understood that the cluster IDs among the above-explained information may be omitted. When these cluster IDs are omitted, the service opening section 440 retrieves such server apparatus 18 contained in all of the clusters which can be retrieved from the service database (FIG. 7) of the service information acquiring section 40.

In the case that a cluster ID is designated, the service opening section 440 refers to the server distribution information (see FIG. 11) entered from the retrieve range setting section 42 so as to retrieve service information of a server apparatus 18 contained in the designated cluster.

[Opening Control Section 442]

The opening control section 442 determines such a network 12 to which the client apparatus 16 belongs (namely, request source network 12) from the network address of the client apparatus 16 contained in the retrieve condition.

[Filtering Process Operation]

While the opening control section 442 refers to the use permission information of the service information (FIG. 8) entered from the service opening section 440, this opening control section 442 performs such a filtering process operation that such a service information openable to the request source network is outputted to the service retrieving section 46.

In other words, in such a case that the use permission information involved in the service information entered from the service opening section 440 indicates such a fact that the use is permitted within the network 12 to which this server apparatus 18 belongs, only when the request source network 12 is equal to the network to which this server apparatus 18 belongs, the opening control section 442 outputs the service information to the service retrieving section 46. In any other cases, the opening control section 442 does not output the service information to the service retrieving section 46.

Alternatively, in the case that the use permission information indicates such a fact that the use is allowed only in a specific network 12, only when the request source network 12 is contained in the specific network, the opening control section 442 outputs the service information to the service retrieving section 46. In other cases, the opening control section 442 does not output such service information to the service retrieving section 46.

[Service Retrieving Section 46]

The service retrieving section 46 (see FIG. 6) receives both a retrieve request issued from the client apparatus 16 contained in the same network 12 and another retrieve request issued from the service retrieving section 46 of the service retrieving apparatus 3 (service retrieving program 4) of another network 12. Based upon the retrieve condition contained in these retrieve requests and also the retrieve range entered from the retrieve range setting section 42, this service retrieving section 46 requests to retrieve service information for the service opening section 44, or the service retrieving apparatus 3 (service retrieving program 4) of another network 12.

Also, the service retrieving section 46 returns such retrieved results to both the client apparatus 16 which issues the retrieving request and the service retrieving section 46 of another service retrieving program 4, while these retrieved results are returned in response to inquiries for the service opening section 44 of the same service retrieving program 4, and the service retrieving apparatus 3 (service retrieving program 4) of another network 12.

Referring now to the flow charts shown in FIG. 14 and FIG. 15, process operations of the service retrieving section 46 will be described more in detail.

[Retrieving Request Issued from Same Network 12]

Figure 14:
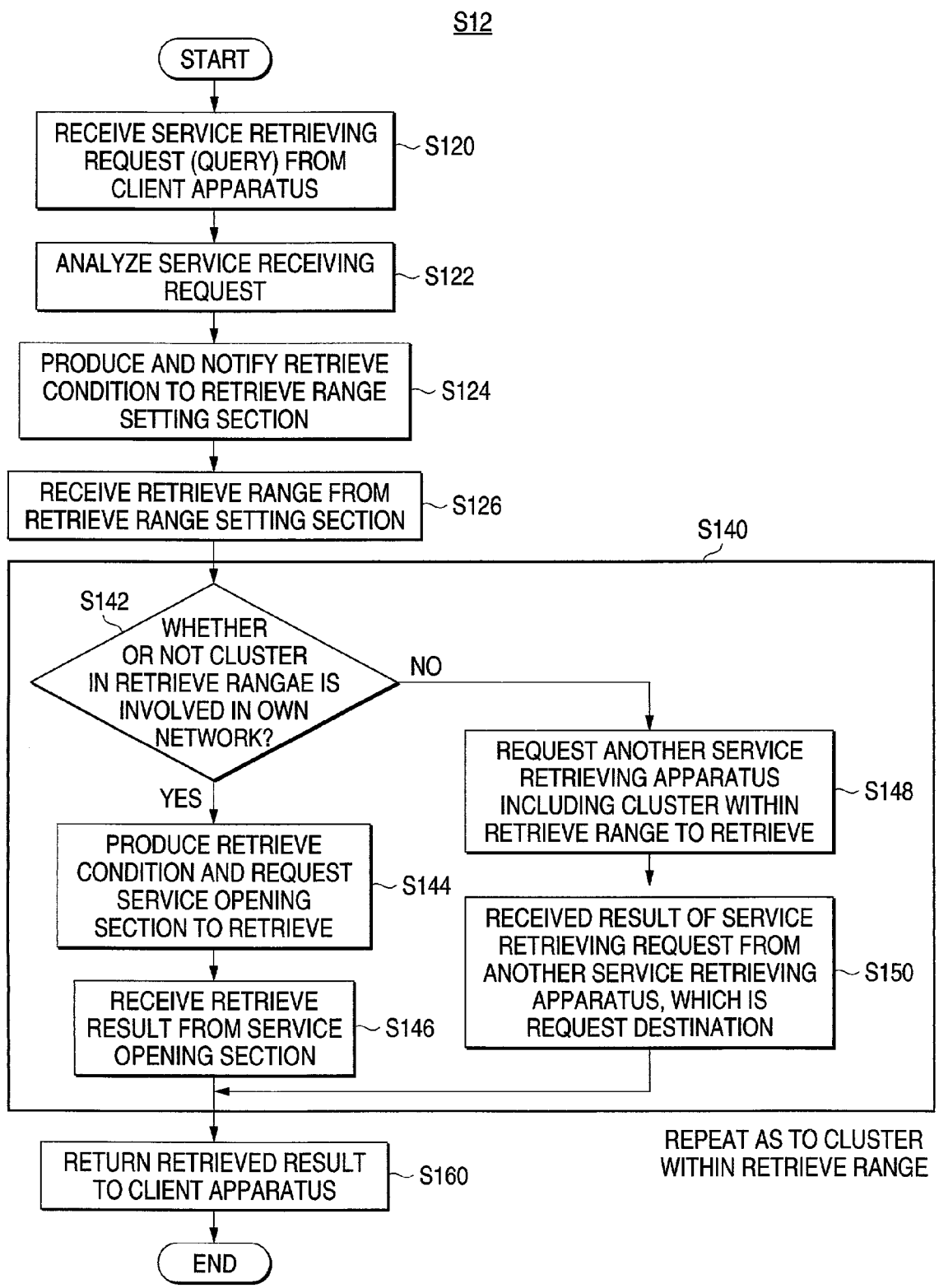
FIG. 14 is a flow chart for describing a retrieving process operation (S12) of a service retrieving section 46 (FIG. 6) of the service retrieving apparatus (service retrieving program) which receives a service retrieving request issued from the client apparatus belonging to the same network (FIG. 4).

FIG. 14 is a flow chart for describing contents of the retrieving process operation (step S12) of the service retrieving section 46 (FIG. 6) of the service retrieving apparatus 3 (service retrieving program 4) which receives the service retrieving request sent from the client apparatus 16 which belongs to the same network 12 (FIG. 4).

In a step S120 of this flow chart, the service retrieving section 46 receives the service retrieving request (query) sent from the client apparatus 16 which belongs to the same network 12.

In a step 122 (S122), the service retrieving section 46 analyzes the received service retrieving request.

In a step 124 (S124), the service retrieving section 46 outputs a retrieve condition to the retrieve range setting section 42.

In a step 126 (S126), the service retrieving section 46 receives such retrieve range information from the retrieve range setting section 42, while this retrieve range information contains both an address of the primary service retrieving apparatus 3 of another network 12 which should be set as the retrieve range, and cluster information (FIG. 10) of a cluster which should be set as the retrieve range.

The service retrieving section 46 repeatedly performs the process operations defined from a step S142 to a step S150, which are contained in the step S140 as to all of the clusters located within the retrieve range.

In the step 142 (S142), the service retrieving section 46 judges as to whether or not one of the clusters contained in the retrieve range is involved in the network 12 to which the own service retrieving section 46 belongs.

In the case that this cluster is involved in the network 12 to which the own service retrieving section 46 belongs, the process operation is advanced to a further process operation defined in a step S144. In any other cases, the process operation is advanced to another process operation defined in a step S148.

In the step 144 (S144), the service retrieving section 46 produces a retrieve condition, and requests the service opening section 44 to execute the service retrieving operation.

In the step 146 (S146), the service retrieving section 46 receives a retrieved result from the service opening section 44.

In a step 148 (S148), the service retrieving section 46 requests the execution of the service retrieving operation to the primary service retrieving apparatus 3 of another network 12 to which the cluster of the retrieve range belongs.

In a step 150 (S150), the service retrieving section 46 receives a result of the service retrieving operation from the primary service retrieving apparatus 3 of another network 12 to which the cluster of the retrieve range belongs.

In a step 160 (S160), the service retrieving section 46 returns the retrieved result to such a client apparatus 16 which requests the service retrieving operation.

[Retrieving Request Issued from Another Network 12]

Figure 15:
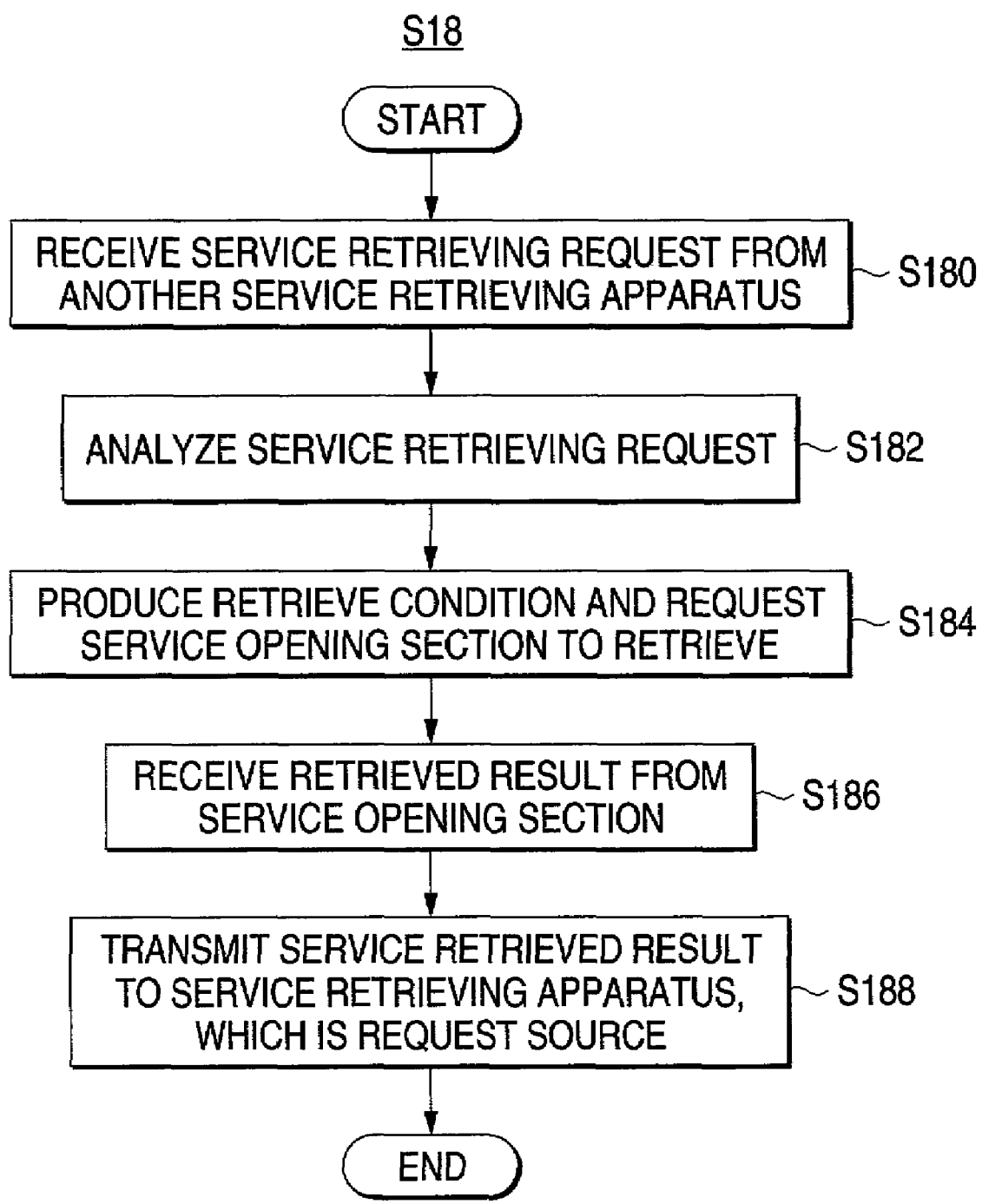
FIG. 15 is a flow chart for describing a retrieving process operation (S18) of a service retrieving section (FIG. 6) of the primary service retrieving apparatus (service retrieving program) which receives a service retrieving request issued from the client apparatus belonging to another network (FIG. 4).

FIG. 15 is a flow chart for describing contents of the retrieving process operation (step S18) of the service retrieving section 46 (FIG. 6) of the primary service retrieving apparatus 3 (service retrieving program 4) which receives the service retrieving request sent from the client apparatus 16 which belongs to another network 12 (FIG. 4)

In a step 180 (S18O), the service retrieving section 46 receives a request of a service retrieving operation issued from the primary service retrieving apparatus 3 of another network 12 to which the own service retrieving section 46 does not belong.

In a step 182 (S182), the service retrieving section 46 analyzes the service retrieving request.

In a step 184 (S184), the service retrieving section 46 produces a retrieve condition, and requests the service opening section 44 to execute the service retrieving operation.

In a step 186 (S186), the service retrieving section 46 receives a retrieved result from the service opening section 44.

In a step 188 (S188), the service retrieving section 46 transmits retrieved result to the primary service retrieving apparatus 3 of the service retrieving request source.

[Operation of Wide-Area Network 5]

Next, an overall operation of the wide-area network 5 (see FIG. 4) will now be explained.

[Acquisition of Service Information at Initial Stage of Service Retrieving Apparatus 3]

First, a description will be given on an acquisition of service information which is carried out just after the primary service retrieving apparatus 3 is registered on the directory apparatus 50 (namely, initial stage), as previously explained with reference to FIG. 12.

Figure 16:
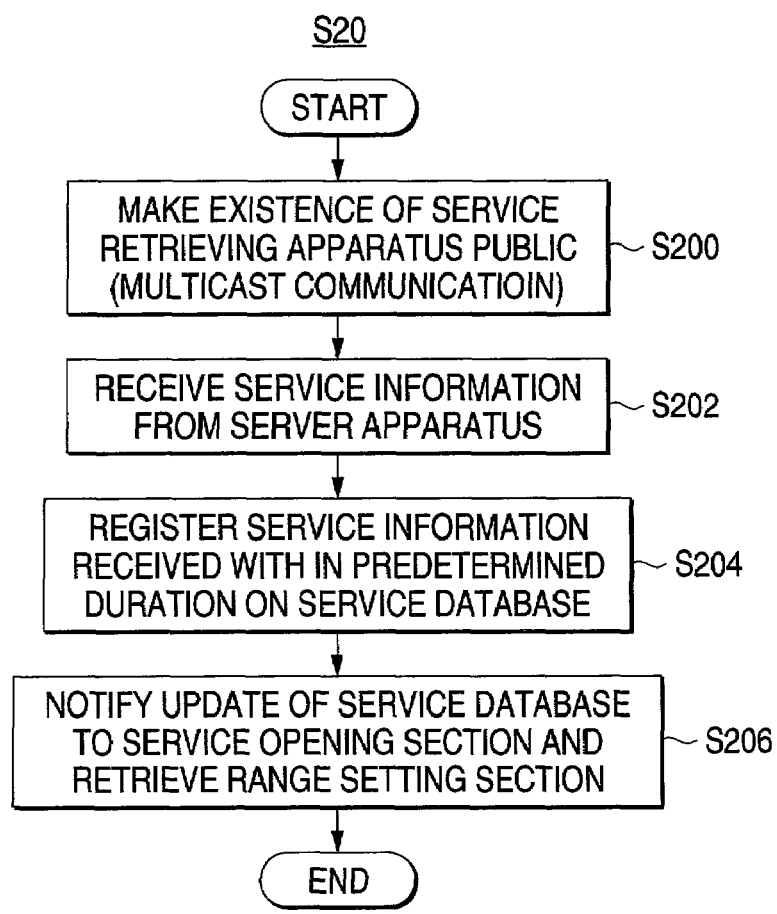
FIG. 16 is a flow chart for explaining a service information acquiring process operation (S20) executed just after the service retrieving apparatus (service retrieving program of FIG. 6) is registered into a directory apparatus (initial stage).

FIG. 16 is a flow chart for explaining the service information acquiring process operation (step S20) which is executed just after the service retrieving apparatus 3 (service retrieving program 4 shown in FIG. 6) is registered into the directory apparatus 50.

Figure 17:
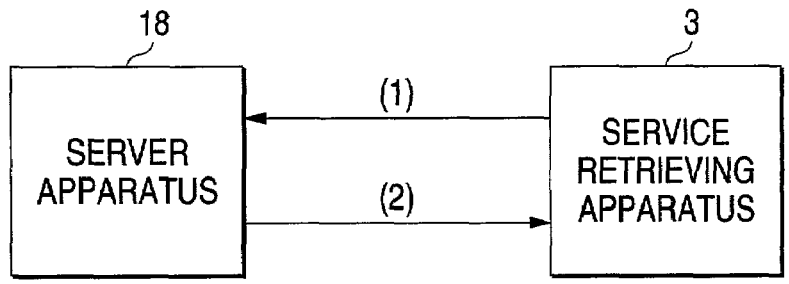
FIG. 17 is a diagram for showing a service information acquiring process operation executed at the initial stage of the service retrieving apparatus (service retrieving program of FIG. 6) shown in FIG. 16.

FIG. 17 is a schematic diagram for schematically indicating a service information acquiring process operation executed at the initial stage of the service retrieving apparatus 3 (service retrieving program 4 shown in FIG. 6) indicated in FIG. 16.

In each of the networks 12, the service information acquiring section 40 of the primary service retrieving apparatus 3 (service retrieving program 4) which has been registered on the directory apparatus 50 requests service information for the server apparatus 18 which belongs to the same network 12 by way of the multicast communication in a step 200 (S200) of FIG. 16, and opens the existence thereof (see FIG. 17(1)) subsequent to this registering operation.

The server apparatus 18 is waiting for receiving the request of the service information issued from the primary service retrieving apparatus 3. Upon receipt of this service information request, this server apparatus 18 returns service information to the service retrieving apparatus 3 (see FIG. 17(2)).

In a step 202 (S202), the service information acquiring section 40 receives the service information from the server apparatus 18.

In a step 204 (S204), the service information acquiring section 40 registers such service information into the service database (FIG. 7), while this service information has been received within a predetermined time duration from the process operation defined in the step S200.

In a step 206 (S206), the service information acquiring section 40 notifies the update of the service database to both the service opening section 44 and the retrieve range setting section 42.

[Acquisition of Service Information of Newly Connected Server Apparatus 18]

Next, a description will now be made of an acquisition operation of service information which is executed when the server apparatus 18 is added to the network 12.

Figure 18:
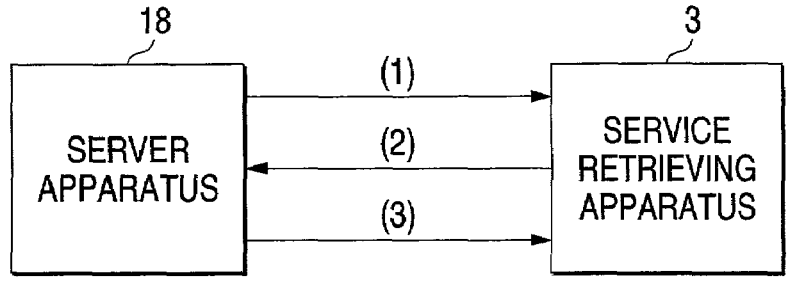
FIG. 18 is a diagram for representing a service information acquiring process operation of the service retrieving apparatus (service retrieving program of FIG. 6).

FIG. 18 is a schematic diagram for indicating a service information acquiring process operation of the service retrieving apparatus 3 (service retrieving program 4 shown in FIG. 6).

Figure 19:
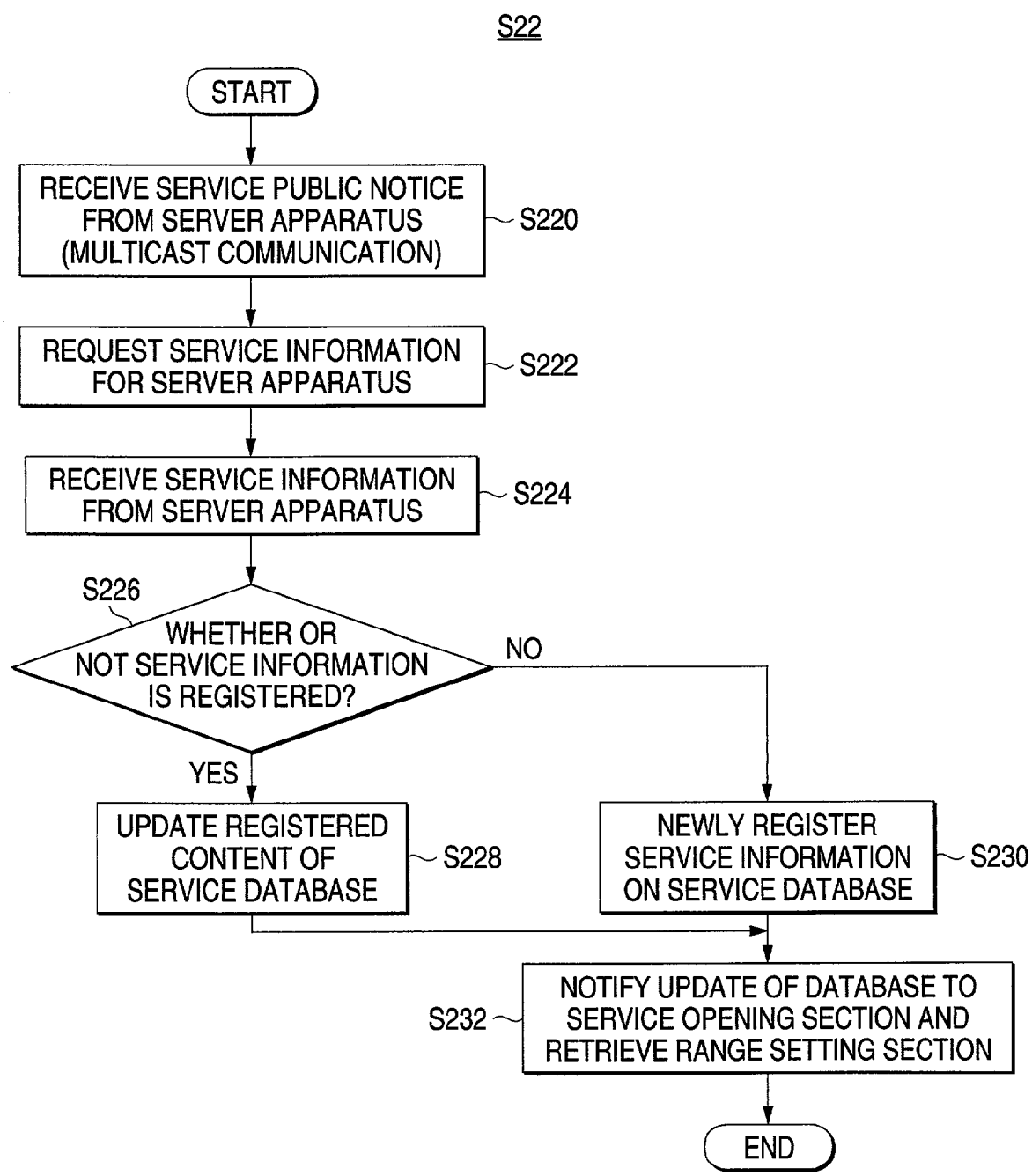
FIG. 19 is a flow chart for representing a service information acquiring process operation (S22) of the service retrieving apparatus (service retrieving program of FIG. 6).

FIG. 19 is a flow chart for describing the service information acquiring process operation of the service retrieving apparatus 3 (service retrieving program 4 shown in FIG. 6).

As indicated in FIG. 18, when the server apparatus 18 are connected in the respective networks 12 and are activated, the server apparatus 18 publicly opens such information related to the existence of the own server apparatus 18 and services to be provided by way of the multicast communication with respect to the structural components within the connected networks 12 (FIG. 18(1)).

As shown in a step 220 (S220) of FIG. 19, the service information acquiring section 40 (see FIG. 6) of the primary service retrieving apparatus 3 (service retrieving program 4) is waiting for receiving a public open from the server apparatus 18, and then receives the public open from the server apparatus 18.

In a step 222 (S222), the primary service retrieving apparatus 3 requests service information for the server apparatus 18 which has carried out the multicast communication (FIG. 18(2)).

The server apparatus 18 which is required service information returns the service information with respect to the primary service retrieving apparatus 3 (FIG. 18(3)).

In a step 224 (S224), the service information acquiring section 40 of the service retrieving apparatus 3 (service retrieving program 4) receives the service information which is returned from the server apparatus 18.

In a step 226 (S226), the service information acquiring section 40 judges as to whether or not the received service information from the server apparatus 18 has already been registered as an entry of the service database (FIG. 7).

When the service information is registered as the entry of the service database, the process operation is advanced to a process operation defined in a step S228. In other cases, the process operation is advanced to another step S230.

In the step 228 (S228), the service information acquiring section 40 updates the contents of the service database, and notifies this update to both the retrieve range setting section 42 and the service opening section 44.

In a step 230 (S230), the service information acquiring section 40 newly registers the received service information of the server apparatus 18 on the service database.

In a step 232 (S232), the service information acquiring section 40 notifies the updated content of the service database to both the retrieve range setting section 42 and the service opening section 44.

[Holding/Deleting of Service Information]

As previously explained, the primary service retrieving apparatus 3 which has received the service information sent from the respective server apparatus 18 holds the service information transmitted from the respective server apparatus 18 without receiving new service information until a predetermined time period has passed.

Figure 20:
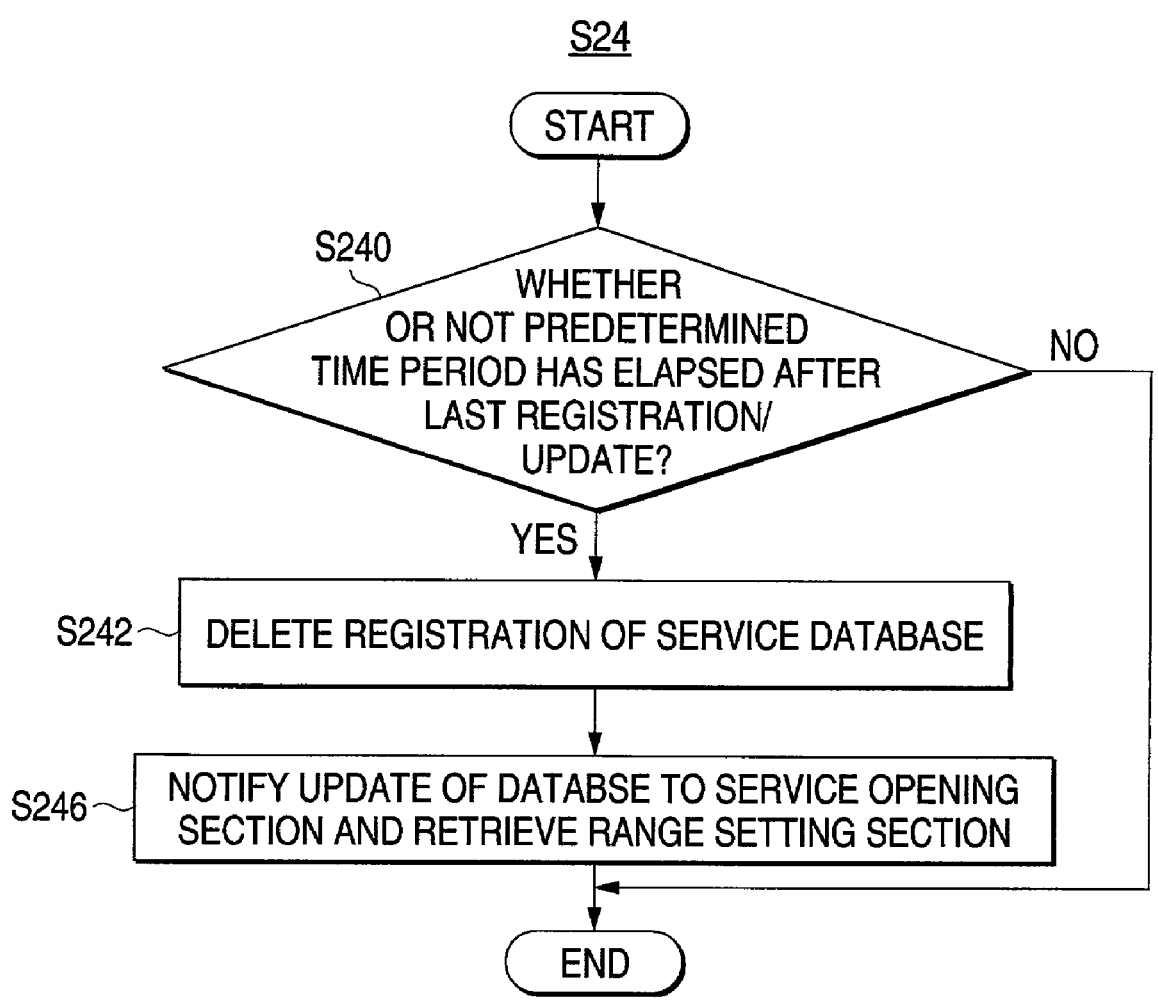
FIG. 20 is a flow chart for showing a process operation (S24) in which the service information acquiring section 40 of the service retrieving apparatus (service retrieving program) deletes the service information.

FIG. 20 is a flow chart for explaining the process operation (step S24) in which the service information acquiring section 40 of the service retrieving apparatus 3 (service retrieving program 4) deletes the service information.

The service information acquiring section 40 of the primary service retrieving apparatus 3 (service retrieving program 4) judges as to whether or not a predetermined time period has elapsed after the respective entries of the service database (FIG. 7) have been finally updated in a step 240 (S240) shown in FIG. 20.

In the case that the predetermined time period has not yet elapsed, the service information acquiring section 40 finishes this delete process operation.

In a step 222 (S222), the service information acquiring section 40 deletes such an entry when the predetermined time period has passed among the entries of the service database.

In a step 224 (S224), the service information acquiring section 40 notifies such a fact that the content of the service database is updated to both the retrieve range setting section 42 and the service opening section 44.

It should also be noted that when the service opening section 44 receives new service information from the server apparatus 18, this service opening section 44 stores/holds the newly received service information by substituting the above-described service information which has been so far held. The service opening section 44 notifies such a fact to both the retrieve range setting section 42 and the service opening section 44.

The above-described predetermined time period during which the entries of the service database are held is normally selected to be, for example, 2 days, or the like set by a manager of the primary service retrieving apparatus 3.

In the case that this time period is selected to be approximately 2 days, even when the primary service retrieving apparatus 3 is frequently finished/activated, there is no possibility that the service information is not deleted every time this primary service retrieving apparatus 3 is finished/activated.

Figure 21:
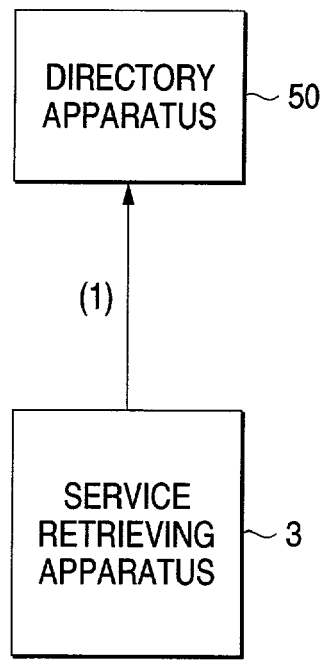
FIG. 21 is a diagram for indicating a process operation in which the service retrieving apparatus registers cluster information into the directory apparatus.

FIG. 21 is a schematic diagram for indicating such a process operation in which the service retrieving apparatus 3 registers cluster information on the directory apparatus 50.

As indicated in FIG. 21, the retrieve range setting section 42 of the service retrieving apparatus 3 (service retrieving program 4) registers the respective clusters formed in the above-described manner, and both the representative points and the cluster sizes thereof on the directory apparatus 50 as the cluster information (FIG. 10) (see FIG. 21(1)).

[Operations of Wide-Area Network 5]

Figure 22:
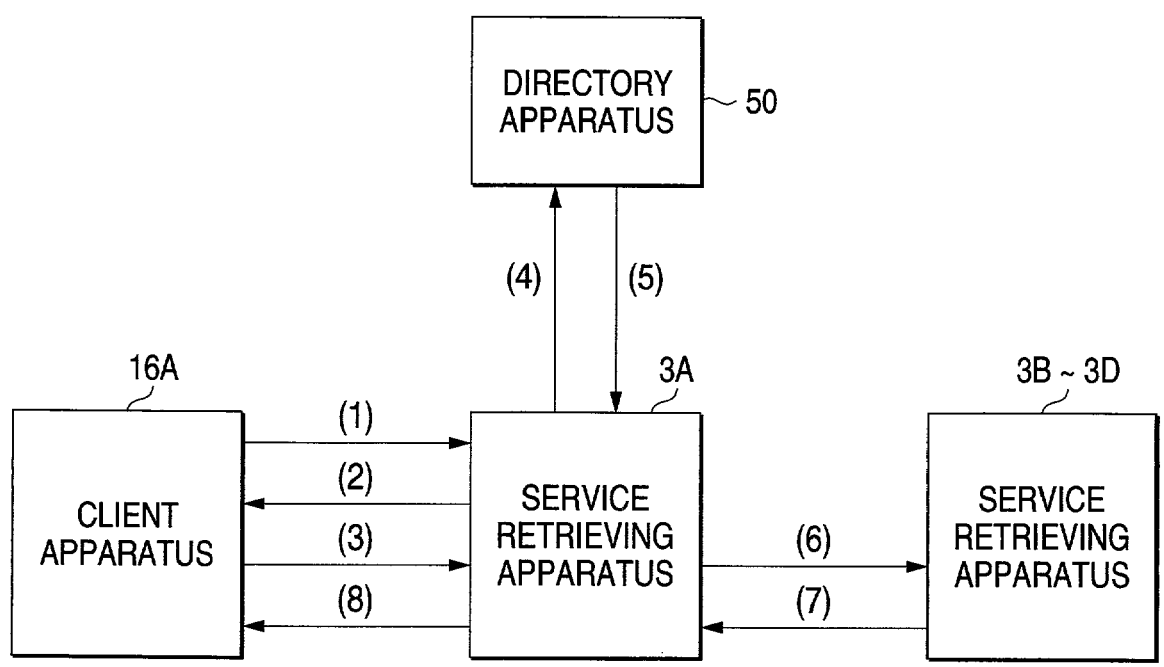
FIG. 22 is a first diagram for indicating overall operation of a primary service retrieving apparatus (service retrieving program) of a network 12A.

FIG. 22 is a first schematic diagram for indicating an entire operation of the primary service retrieving apparatus 3A (service retrieving program 4) of the network 12A.

Figure 23:
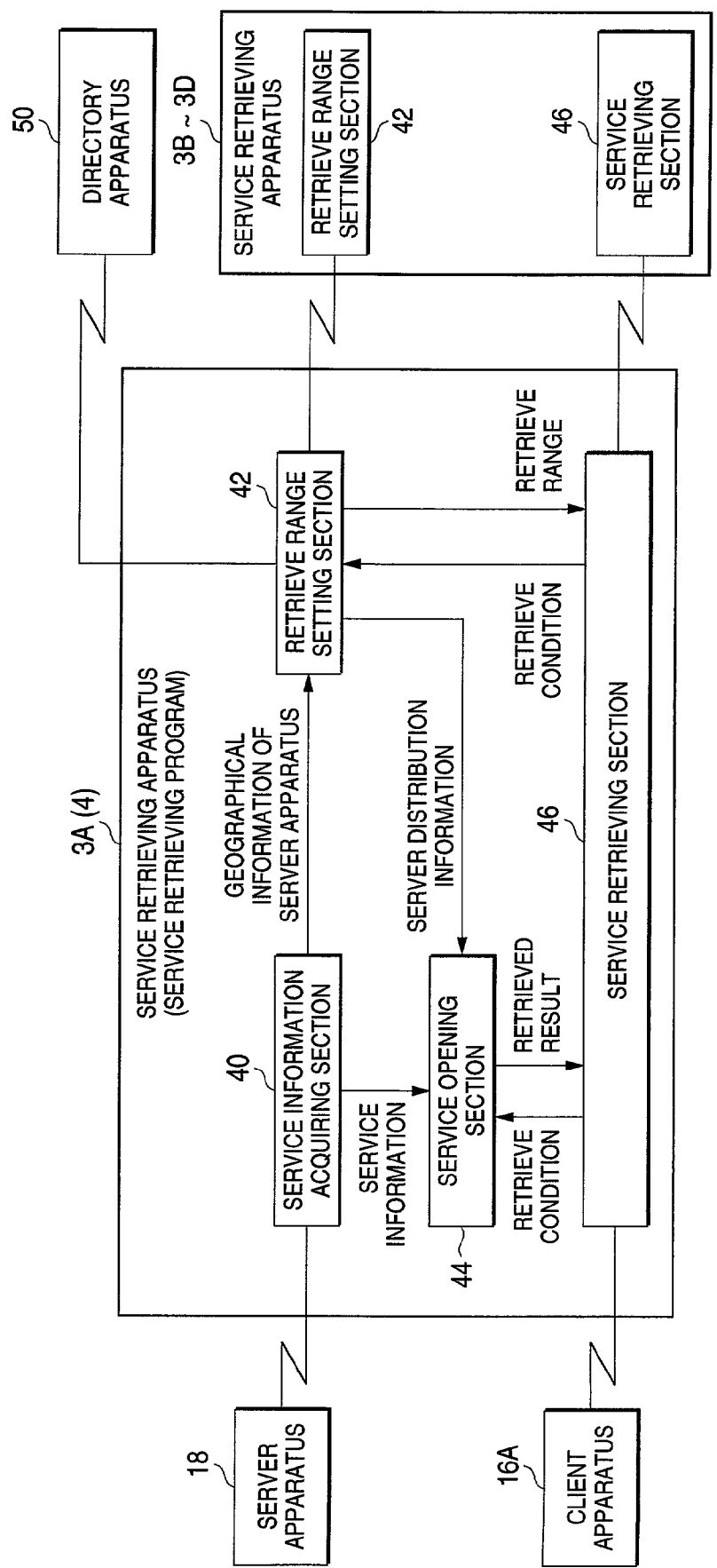
FIG. 23 is a second diagram for indicating overall operation of a primary service retrieving apparatus (service retrieving program) of the network 12A.

FIG. 23 is a second schematic diagram for indicating an entire operation of the primary service retrieving apparatus 3A (service retrieving program 4) of the network 12A.

Referring now to FIG. 22 and FIG. 23, while the primary service retrieving apparatus 3A of the network 12A is employed as an example, overall operations of the wide-area network 5 which have been previously explained will be described entirely.

The client apparatus 16A (FIG. 4) performs the multicast communication within the network 12A, and requires the primary service retrieving apparatus 3A located within the network 12A to send the response therefrom (FIG. 22(1)).

As indicated in FIG. 23, while the service retrieving section 46 (FIG. 6) of the primary service retrieving apparatus 3A (service retrieving program 4) of the network 12A are waiting for receiving the multicast communication from the client apparatus 16A, when the service retrieving section 46 receives the multicast communication (FIG. 22(1)) from the client apparatus 16A, this primary service retrieving apparatus 3A returns the response (FIG. 22(2)).

The client apparatus 16A issues the retrieve request (query) by attaching thereto both the geographic information (latitude/longitude etc.) of the client apparatus 16A and the retrieve condition to the primary service retrieving apparatus 3A which returns the response (FIG. 22(3)).

The retrieve condition attached to the query contains, for example, a retrieve subject region, a retrieve subject network, and a condition of a service to be received (retrieve service condition).

When the service retrieving section 46 of the service retrieving apparatus 3A (service retrieving program 4) receives the query sent from the client apparatus 16A, the primary service retrieving apparatus 3A starts the retrieving operation.

As indicated in FIG. 23, the service retrieving section 46 of the service retrieving apparatus 3A (service retrieving program 4) notifies the retrieve condition to the retrieve range setting section 42 (FIG. 6).

For example, in the case that both the retrieve subject region and the retrieve subject network are not designated in the query, the retrieve range setting section 42 of the primary service retrieving apparatus 3A (service retrieving program 4) sets all of the regions of the network 12A as the retrieve range, and then, notifies this retrieve range to the service retrieving section 46.

The service retrieving section 46 of the service retrieving apparatus 3A (service retrieving program 4) notifies the retrieve condition to the service opening section 44 (FIG. 6) so as to request this service opening section 44 to retrieve the service information of the server apparatus 18A contained in the network 12A.

In response to this retrieve request, the service opening section 44 executes the service information retrieving operation, and returns the retrieved result to the service retrieving section 46.

Also, for example, in such a case that an area geographically close to the client apparatus 16A is designated as the retrieve subject region in the query of the client apparatus 16A, the retrieve range setting section 42 of the service retrieving apparatus 3A (service retrieving program 4) sets all of the clusters of the networks 12A to 12D which contain the location of the client apparatus 16A to the retrieve range.

The service retrieving section 46 of the service retrieving apparatus 3A (service retrieving program 4) requests the service opening section 44 to retrieve the service information of the server apparatus 18A which is contained in all of the clusters within the retrieve range set to the network 12A. The service opening section 44 retrieves the service information in response to this service information retrieving request, and returns the retrieved result.

Furthermore, the retrieve range setting section 42 of the service retrieving apparatus 3A (service retrieving program 4) requests the addresses of the primary service retrieving apparatus 3B to 3D of other networks 12B to 12D to the directory apparatus 50 (FIG. 22 (4)). Then, the directory apparatus 50 retrieves the addresses of the service retrieving apparatus 3B to 3D in response to this request, and returns the retrieved result to the retrieve range setting section 42 of the service retrieving apparatus 3A (FIG. 4(5)).

The addresses of the service retrieving apparatus 3B to 3D from the directory apparatus 50 are notified to the service retrieving section 46.

The retrieve range setting section 42 of the service w retrieving apparatus 3A (service retrieving program 4) requests the retrieve range setting section 42 of the service retrieving apparatus 3B to 3D (service retrieving program 4) belonging to the networks 12B to 12D to retrieve the server apparatus 18 contained in the clusters which contain the location of the client apparatus 16A in the networks 12B to 12D, while attaching thereto the geographical information of the client apparatus 16A.

In response to the request issued from the service retrieving apparatus 3A, the service retrieving apparatus 3B to 3D of the networks 12B to 12D retrieve the service information of the server apparatus 18 within the clusters which contain the locations of the client apparatus 16A. Then, the service retrieving apparatus 3B to 3D of the networks 12B to 12D return the retrieved result to the service retrieving section 46 of the service retrieving apparatus 3A (service retrieving program 4) of the network 12A (FIG. 22(7)).

The service retrieving section 46 of the service retrieving apparatus 3A (service retrieving program 4) returns such retrieved results to the client apparatus 16A, while these retrieved results are obtained from the service opening section 44 of the service retrieving apparatus 3A (service retrieving program 4), and also, from the service retrieving apparatus 3B to 3D of other networks 12B to 12D (FIG. 22(8)).

[Clustering Process Operation]

The retrieve range setting section 42 processes the geographical information contained in the service information (FIG. 8) which is acquired by the service information acquiring section 40, clustering-processes the server apparatus 18A within the network 12A as indicated in FIG. 2, and further, acquires both the gravity center of each of the clusters and the cluster size thereof, which are obtained as the results of the clustering process so as to form the cluster information (FIG. 10).

The retrieve range setting section 42 produces the cluster distribution information, and then, outputs the produced cluster distribution information with respect to the service opening section 44.

[Retrieving Process Operation]

As indicated in FIG. 14, the service retrieving section 46 of the service retrieving apparatus 3A (service retrieving program 4 shown in FIG. 6) which receives the service retrieving request from the client apparatus 16 belonging to the same network 12A (FIG. 4) receives setting of the retrieve range from the retrieve range setting section 42, and outputs this received retrieve range to both the service opening section 44 of the same service retrieving apparatus 3A (service retrieving program 4), and also, the primary service retrieving apparatus 3B to 3D of other networks 12B to 12D in order to request the service retrieving operation.

The service opening section 44 performs the filtering process operation based upon the use permission condition and the like, and returns the filtering-processed retrieved result of the service retrieving section 46.

The service retrieving section 46 transmits to the client apparatus 16A, both the retrieved result which is returned from the service opening section 44 of the same service retrieving apparatus 3A (service retrieving program 4), and also, the retrieved result which is returned from the service retrieving apparatus 3B to 3D of other networks 12B to 12D.

As shown in FIG. 15, such a service retrieving section 46 (FIG. 6) of the primary service retrieving apparatus 3A (service retrieving program 4) requests the service opening section 44 to execute the service retrieving operation, and receives the filtering-process retrieve result. This service retrieving section 46 (FIG. 6) receives the service retrieving request from the client apparatus 16B (not shown in FIG. 4) which belongs to any one network (for example, network 12B) of other networks 12B to 12D.

The service retrieving section 46 transmits the retrieved result which is received from the service opening section 44 to the service retrieving apparatus 3B of the network 12B as the service retrieving request source.

The service retrieving apparatus 3B as the service retrieving request source merges the service information received from other networks 12A, 12C, 12D into the service information received from the service opening section 44 contained in the same service retrieving apparatus 3B (service retrieving program 4), and then, returns the merged service information to the client apparatus 16B of the service retrieve request source belonging to the same networks 12A, 12C, 12D.

[Modifications]

It should be understood that the above-explained example describes that the service retrieving apparatus 3 acquires the service information from the respective server apparatus 18 in accordance with the specifically-provided communication sequence shown in FIG. 18. Alternatively, the service retrieving apparatus 3 may acquire the service information in accordance with the presently available network management protocol such as the SNMP.

Also, the service retrieving apparatus 3 may provide the service information by employing a Web page with respect to the client apparatus 16.

Also, while such service retrieving apparatus which are located close to each other (in view of geographical space and/or network space) are previously communicated to each other so as to duplicate the service information held by the respective service retrieving apparatus, the retrieving operation of the service information may be carried out in high speeds.

Also, the service retrieving apparatus 3 may save the service information acquired from other service retrieving apparatus 3 in a cache memory.

Furthermore, while the service information of all of other service retrieving apparatus 3 is stored in the respective service retrieving apparatus 3, in the case that the geographically close retrieve range is set, the service retrieving apparatus 3 may execute the retrieving process operation from the stored service information.

Also, while the service retrieving apparatus 3 totalizes the number of server apparatus 18 which are actually used by the client apparatus 16 from the service information sent to the client apparatus 16, and thus, may reflect the totalized server apparatus 18 as a favorable service on the retrieving process operation.

[Second Embodiment]

Next, a second embodiment of the present invention will now be explained.

Figure 24:
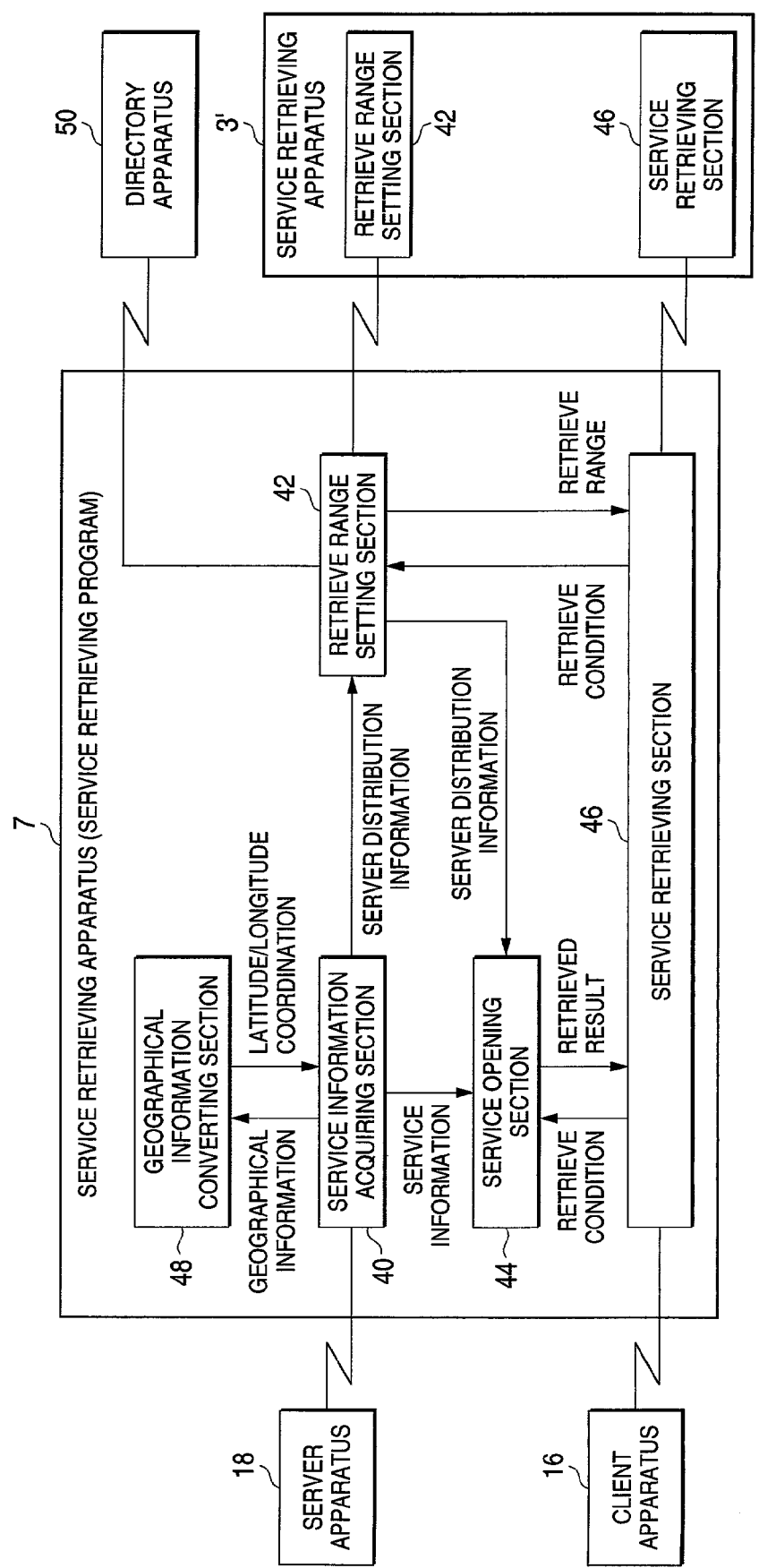
FIG. 24 is a diagram for showing an arrangement of a second service retrieving program according to the present invention.

FIG. 24 is a schematic diagram for indicating an arrangement of a second service retrieving program (second service retrieving apparatus 7) according to the present invention.

As represented in FIG. 24, the service retrieving program 7 is employed instead of the service retrieving program 4, and a geographical information converting section 48 is added to the service retrieving program 4 in the service retrieving apparatus 3 (see FIG. 6 and FIG. 9).

With employment of the above-explained arrangement, the service retrieving program 7 may realize a function similar to that of the service retrieving apparatus 3 in such a manner that as the geographical information of the service information (FIG. 8), either a governmental section name or a postal number are used instead of the latitude/longitude information of the server apparatus 18 (FIG. 4).

[Geographical Information Converting Section 48]

In the service retrieving program 7, the geographical information converting section 48 converts either a governmental section or a postal code of a location of each of the server apparatus 18, which are contained in the service information acquired by the service information acquiring section 40, into latitude/longitude information, and then, outputs the converted latitude/longitude information to the service information acquiring section 40.

In the service retrieving program 7, the service information acquiring section 40 executes a process operation similar to that of the service retrieving program 4 by employing the respective latitude/longitude information of the server apparatus 18, which are inputted from the geographical information converting section 48.

[Modification]

It should also be understood that the wide-area network 4 may be arranged in such a manner that the geographical information converting section 48 is equipped with the directory apparatus 50, and this geographical information converting section 48 can be commonly used by a large number of networks 12.

Also, while the geographical information converting section 48 is not equipped within the service retrieving apparatus 3 (service retrieving program 7), this geographical information converting section 48 may be connected to the wide-area network 5 as an independently provided apparatus.

[Third Embodiment]

Next, a third embodiment of the present invention will now be described.

Figure 25:
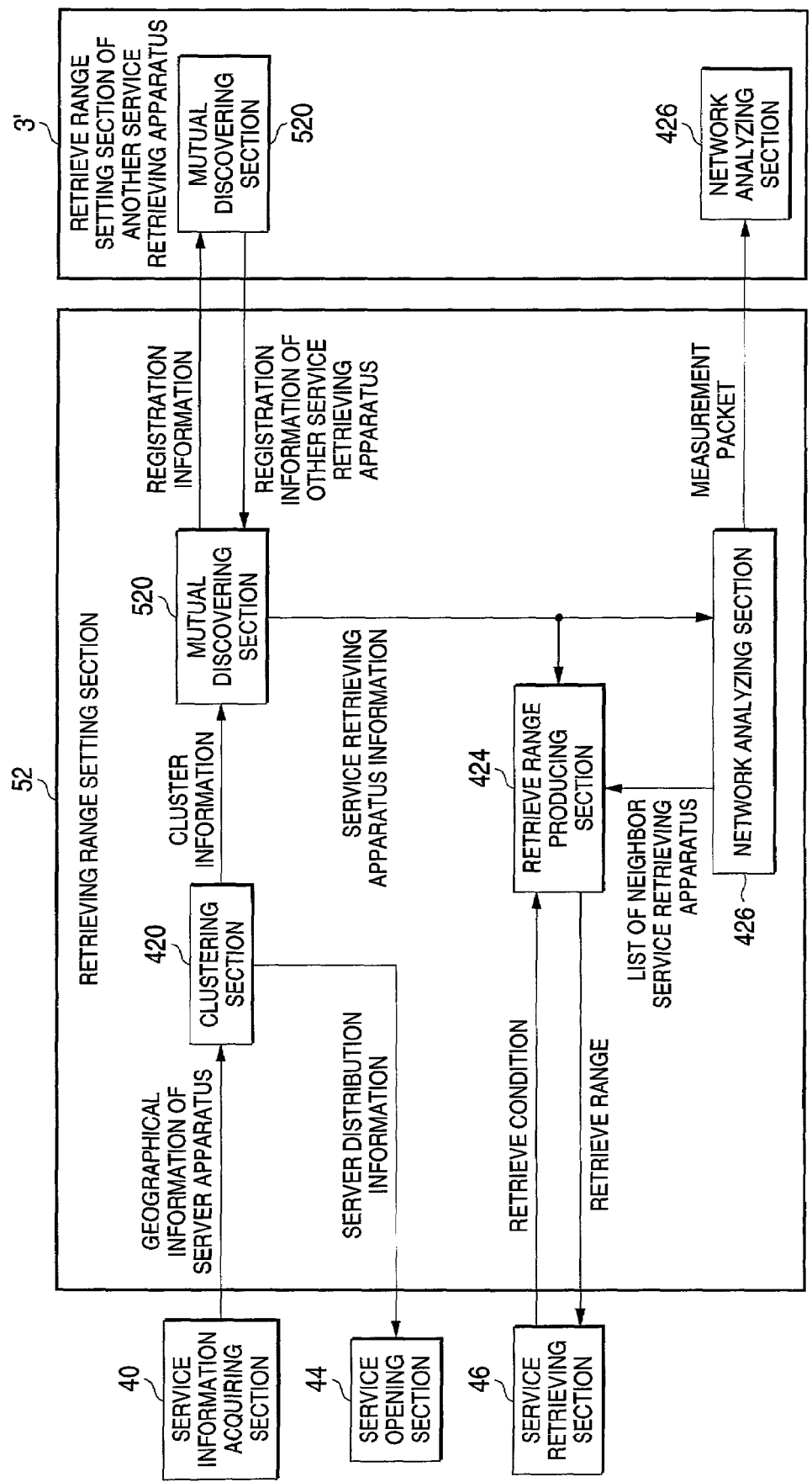
FIG. 25 is a diagram for indicating an arrangement of a second retrieve range setting section according to the present invention.

FIG. 25 is a schematic block diagram for representing an arrangement of a second retrieve range setting section 52 which is replaced by this retrieve range setting section 42 in the service retrieving program 4 (FIG. 6 and FIG. 8).

As shown in FIG. 25, this second retrieve range setting section 52 is arranged in such a manner that the mutual discovering section 422 of the retrieve range setting section 42 is changed to another mutual discovering section 520.

In the service retrieving program 4, since the retrieve range setting section 42 is replaced by the retrieve range setting section 50, the wide-area network 5 may be constituted by employing the directory apparatus 50.

[Mutual Discovering Section 520]

In the wide-area network 5 into which the retrieve range setting section 52, the service retrieving apparatus 3 constitutes a hierarchical network having a tree structure.

When each of the service retrieving apparatus 3 is installed, a network address of such a service retrieving apparatus 3 located at one upper grade is set thereto by a manager. The mutual discovering section 520 is communicated with such a mutual discovering section 520 of the service retrieving apparatus 3 (service retrieving program 4) located at one upper grade than the own grade so as to register the own network address into the service retrieving apparatus 3 (service retrieving program 4) located at one upper grade than the own grade. Also, the mutual discovering section 520 receives a notification of a network address of such a service retrieving apparatus 3 located at one lower grade than the own grade.

Furthermore, the mutual discovering section 520 sequentially performs communications among the service retrieving apparatus 3 (service retrieving program 4) located at upper and lower grades than the own grade. Furthermore, this mutual discovering section 520 sequentially receives the cluster information (FIG. 10) of the service retrieving apparatus 3 located at upper and lower grades than the own grade.

With execution of the above-described process operation, the mutual discovering section 520 of the service retrieving apparatus 3 (service retrieving program 4) of each of the networks 12 can receive both the network addresses and the cluster information of the service retrieving apparatus located in the entire wide-area network 5.

The mutual discovering section 520 outputs both the received network addresses and the received cluster information of the service retrieving apparatus of the respective networks 12 with respect to both the retrieve range producing section 424 and the network analyzing section 426.

[Modifications]

In the above-described embodiment, when the database is once constructed, it is practically difficult to change the construction of the database due to the following reasons. That is, since the positions of the database on which service retrieving apparatus is registered, within the network must be previously recognized by the service retrieving apparatus itself and the like, the man power and also the knowledge are necessarily required in order to operate the system. Furthermore, in order to realize the database by employing the directory structure, the directory structure over the entire network must be constituted in a schema manner.

Under such a circumstance, it may be considered to modify the service retrieving method of the present invention such that one service retrieving apparatus may automatically discover another service retrieving apparatus without being registered into an upper directory.

Concretely speaking, the service retrieving operation may be performed as follows:

That is, while the client apparatus communicates with such a server apparatus which is located within another retrieving region (another region) to which the own client apparatus does not belong, when the client apparatus receives the provision of the service, the client apparatus notifies to the server apparatus, such a position of the service retrieving apparatus within the network, which is contained in the retrieving region (the same region) into which the own service retrieving apparatus is contained.

Conversely, the server apparatus notifies such a position of the service retrieving apparatus located in the retrieving region (the same region) to which the own server apparatus is contained to the service retrieving apparatus in a retrieving region to which the client apparatus is involved.

The service retrieving apparatus in the retrieving region into which the client apparatus is contained mutually notifies the positions of the service retrieving apparatus which have been so far acquired to the service retrieving apparatus in the retrieving region into which the server apparatus is involved.

With employment of such a construction, since the position of the service retrieving apparatus is mutually communicated among the service retrieving apparatus which are involved in the retrieving regions (areas) different from each other, the service retrieving results obtained among the service retrieving apparatus which are contained in the respective different retrieving regions are provided for the client apparatus. As a result, while the service retrieving available region maybe widened, the database may be constructed in a flexible manner.

As previously explained, in accordance with the service retrieving apparatus and the service retrieving method of the present invention, while such a retrieving operation is carried out in the network in such a manner that any of the nodes may provide which service, and the retrieved service maybe provided for the node which tries to receive the service.

Also, in accordance with the service retrieving apparatus/method of the present invention, the desirable service can be retrieved within the short processing time without excessively increasing the traffics in the network.

Further, in accordance with the service retrieving apparatus/method of the present invention, the desirable service can be retrieved over a plurality of networks.

What is claimed is:

1. A document service retrieving system for a data network, comprising:
   a plurality of document service providing apparatus for providing document-related services; and
   a document service retrieving apparatus comprising:
      a retrieving range setting section for setting a retrieving range in which a document service is retrieved; and
      a document service retrieving section for retrieving a document service in the retrieving range that outputs to a document service providing apparatus within the retrieving range and providing a retrieve condition related to a document service and geographic information related to a document service providing apparatus to the retrieve range setting section,
   wherein the retrieving range setting section sets the retrieving range based on one or more document service retrieve conditions provided by the document service retrieving section and geographical information retrieved by the document service retrieving section from the plurality of document service providing apparatus, the data network has a plurality of regions, the document service retrieving apparatus is a plurality of document service retrieving apparatus.

at least one document service retrieving apparatus is disposed in each of the regions, the retrieving range setting section sets at least a part of at least one of the regions as the retrieving region, each of the document service retrieving apparatus further comprises a document service acquiring section for acquiring document service information of each of the document service providing apparatus disposed in the same region as each of the document service retrieving apparatus, and the document service retrieving section requests one or more document service retrieving apparatus within the plurality of document service retrieving apparatus to retrieve the document services and receives a retrieved result from the one or more document service retrieving apparatus.

2. The system according to claim 1, wherein as the acquisition of the document service information, the document service acquiring section requests the document service information for each of document service providing apparatus disposed in the same region as each of document service retrieving apparatus and receives the document service information from each of document service providing apparatus disposed in the same region.

3. The system according to claim 1, wherein the document service information includes use condition of the document service;

wherein the document service retrieving apparatus further comprises a filtering section for filtering the document service information based on the use condition of the document service information; and wherein the filtering section transmits the filtering result to the document service retrieving section as a retrieved result.

4. The system according to claim 3, wherein the document service retrieving section retrieves the document services in cooperate with the filtering section, when the document service retrieving section receives a request from the document service retrieving section of another document service retrieving apparatus; and wherein the document service retrieving section transmits the retrieved result to the document service retrieving section of the another document service retrieving apparatus.

5. The system according to claim 1, wherein the document service information and the retrieved result each includes geographical information as to positions of the document service providing apparatus; and wherein the document service range setting section sets the retrieving range based on the geographical information received from the document service acquiring section.

6. The system according to claim 5, wherein the retrieving range setting section clusters positions of the document service providing apparatus disposed in the same region as the retrieving range setting section based on the geographical information to generate cluster information;

wherein the retrieving range setting section acquires the cluster information generated in another region;

wherein the retrieving range setting section sets the retrieving range based on the cluster information generated in the same and another regions.

7. The system according to claim 6, wherein the retrieving range setting section registers the cluster information on the directory apparatus; and wherein as the acquisition of the cluster information, the retrieving range setting section receives the cluster information generated in another region from the directory apparatus.

8. The system according to claim 1, further comprising directory apparatus for registering the document service retrieving apparatus in each of regions thereon, wherein the retrieving range setting section detects another document service retrieving apparatus in the same region as the retrieving range setting section;

wherein the retrieving range setting section registers the own document service retrieving apparatus on the directory apparatus in accordance with the detection result; and wherein the document service retrieving section requests each of other registered document service retrieving apparatus to retrieve the document services and receives the retrieved result from each of other registered document service retrieving apparatus.

9. The system according to claim 1, wherein the retrieving range setting section detects communication condition between the region of the document service retrieving apparatus and the region of another document service retrieving apparatus; and wherein the retrieving range setting section sets the retrieving range based on the detected communication condition.

10. The system according to claim 1, wherein the document service retrieving section retrieves the document service information within the set retrieving range, when the document service retrieving section receives a request and retrieving condition from the document service retrieving section of another document service retrieving apparatus; and the retrieving range setting section sets the retrieving range based on one of the request and the retrieving condition.

11. A service retrieving system in a data network having a plurality of regions, comprising:

a client apparatus including:

a first retrieving means for retrieving a position of a service providing apparatus within the data network by communicating with a retrieving apparatus located in the same area; and a communication means for communicating with the service providing apparatus by employing both the position of the service providing apparatus obtained by the first retrieving means and a position of the service providing apparatus obtained by not using the first retrieving means in the data network, the service providing apparatus including a notification means for notifying a position of the retrieving apparatus within each of regions to one of the client apparatus and the retrieving apparatus in another region, and also in which when a notification of the position of the retrieving apparatus within the another region is received, the notification means notifies the notified position of the retrieving apparatus within the another region to a retrieving apparatus located within the same region; and the retrieving apparatus installed in each of region, while the retrieving apparatus includes:

a notification means for communicating with the retrieving apparatus located within another region by employing the notified position of the retrieving apparatus within the another region and also for mutually notifying the positions of the retrieving apparatus held by each of retrieving apparatus; and a second retrieving means for communicating with the retrieving apparatus located in the another region by employing the notified position of the retrieving apparatus within the another region in response to the communication of the client apparatus located in the same region so as to retrieve a position of the server apparatus, the second retrieving means providing a retrieve condition to the retrieve ranging section, wherein the retrieving range setting section sets the retrieving range based on the retrieve condition provided by the second retrieving section and geographical information of the service providing apparatus.

12. A document service retrieving method for retrieving document services provided in a data network, the method comprising:

setting a retrieving range in the data network;

retrieving document services in the set retrieving range that generate document-related output at a document service providing apparatus within the set retrieving range;

providing a retrieve condition for retrieving the document services;

outputting a request to retrieve the document services and receiving a retrieved result, wherein setting the retrieving range is based on the retrieve condition and geographical information of the document service providing apparatus, the data network has a plurality of regions, and the method acquires information on document service providing apparatus, the method further comprising:

setting at least a part of at least one of the regions as a retrieving region; and acquiring document service information from document service providing apparatus disposed in the retrieving region.

13. A retrieving program for causing a computer to retrieve document services provided in a data network, comprising:

setting a retrieving range in the data network;

retrieving document services in the set retrieving range that generate document-related output at a document service providing apparatus within the set retrieving range; providing a retrieve condition for retrieving the document services; and outputting a request to retrieve the document services and receiving a retrieved result, wherein setting the retrieving range is based on the retrieve condition and geographical information of the document service providing apparatus, the data network has a plurality of regions, and the retrieving program further causes a computer to acquire information on document service providing apparatus, comprising:

setting at least a part of at least one of the regions as a retrieving region; and acquiring document service information from document service providing apparatus disposed in the retrieving region.

14. A recording medium for recording thereon a retrieving program capable of causing a computer to retrieve document services provided in a data network, comprising:

setting a retrieving range in the data network;

retrieving document services in the set retrieving range that generate document-related output at a document service providing apparatus within the set retrieving range;

providing a retrieve condition for retrieving the document services; and outputting a request to retrieve the document services and receiving a retrieved result, wherein setting the retrieving range is based on the retrieve condition and geographical information of the document service providing apparatus, the data network has a plurality of regions, and the retrieving program further causes a computer to acquire information on document service providing apparatus, comprising:

setting at least a part of at least one of the regions as a retrieving region; and acquiring document service information from document service providing apparatus disposed in the retrieving region.

15. A document service retrieving apparatus disposed in a data network, comprising:

a retrieving range setting section for setting a retrieving range in which document services are retrieved;

a document service retrieving section for retrieving a document service in the retrieving range that generates document-related output at a document service providing apparatus within the retrieving range and providing a retrieve condition to the retrieving range setting section; and a document service acquiring section;

wherein the data network has a plurality of regions, the retrieving range setting section sets the retrieving range based on the retrieve condition provided by the document service retrieving section and geographical information of the document service providing apparatus, the retrieving range setting section sets at least a part of at least one of the regions as a retrieving region, the document service acquiring section acquires document service information of document service providing apparatus disposed in the retrieving region, and the document service retrieving section outputs a request to retrieve the document service information and receives a retrieved result.

16. The apparatus according to claim 15, wherein as the acquisition of the document service information, the document service acquiring section requests the document service information for each of document service providing apparatus disposed in the same region and receives the document service information from each of document service providing apparatus disposed in the same region.

17. The apparatus according to claim 16, further comprising a filtering section, wherein the document service information includes use condition of the document service;

wherein a filtering section filters the document service information based on the use condition of the document service information; and wherein the filtering section transmits the filtering result to the document service retrieving section as a retrieved result.

18. The system according to claim 17, wherein the document service retrieving section retrieves the document services in cooperate with the filtering section, when the document service retrieving section receives a request; and wherein the document service retrieving section outputs the retrieved result.

19. The apparatus according to claim 15, wherein the document service information and the retrieved result each includes geographical information as to positions of the document service providing apparatus; and wherein the document service range setting section sets the retrieving range based on the geographical information received from the document service acquiring section.

20. The apparatus according to claim 19, wherein the retrieving range setting section clusters positions of the document service providing apparatus disposed in the same region as the retrieving range setting section based on the geographical information to generate cluster information;

wherein the retrieving range setting section acquires the cluster information generated in another region;

wherein the retrieving range setting section sets the retrieving range based on the cluster information generated in the same and another regions.

21. The apparatus according to claim 20, wherein the retrieving range setting section registers the cluster information on the directory apparatus; and wherein as the acquisition of the cluster information, the retrieving range setting section receives the cluster information generated in another region from the directory apparatus.

22. The apparatus according to claim 15, wherein the retrieving range setting section detects another document service retrieving apparatus in the same region;

wherein the retrieving range setting section registers the own document service retrieving apparatus on a directory apparatus in accordance with the detection result; and wherein the document service retrieving section outputs a request to retrieve the document services and receives the retrieved result.

23. The apparatus according to claim 15, wherein the retrieving range setting section detects communication condition between the region of the document service retrieving apparatus and another region; and wherein the retrieving range setting section sets the retrieving range based on the detected communication condition.

24. The system according to claim 15, wherein the document service retrieving section retrieves the document service information within the set retrieving range, when the document service retrieving section receives a request and retrieving condition; and the retrieving range setting section sets the retrieving range based on one of the request and the retrieving condition.

\* \* \* \* \*